(12) United States Patent
Takahashi et al.

(10) Patent No.: US 6,405,017 B1
(45) Date of Patent: Jun. 11, 2002

(54) ORIGINAL DOCUMENT HOLDING APPARATUS AND ORIGINAL DOCUMENT READING APPARATUS

(75) Inventors: Toshio Takahashi, Toda; Naho Saito, Inagi; Tsuyoshi Yamauchi, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/589,060

(22) Filed: Jun. 8, 2000

(30) Foreign Application Priority Data

| Jun. 9, 1999 | (JP) | 11-162064 |
| Jul. 8, 1999 | (JP) | 11-194229 |
| Jul. 8, 1999 | (JP) | 11-194230 |
| Sep. 6, 1999 | (JP) | 11-252324 |

(51) Int. Cl.[7] .................. G03B 23/00; G03B 27/62; G03G 15/00
(52) U.S. Cl. ........................ 399/380; 355/75
(58) Field of Search ................ 399/377, 379, 399/380; 355/75; 358/474, 494, 497; 248/176.1, 177.1

(56) References Cited

FOREIGN PATENT DOCUMENTS

| JP | 04-056945 | * | 2/1992 |
| JP | 7-43841 | | 2/1995 |
| JP | 08-289100 | * | 11/1996 |
| JP | 10-285353 | * | 10/1998 |

* cited by examiner

Primary Examiner—Sophia S. Chen
(74) Attorney, Agent, or Firm—Fitzpatrick, Cella, Harper & Scinto

(57) ABSTRACT

An original document holding apparatus for closely contacting an original document with a contact glass surface includes an original document pressing plate, a pressing-contacting sheet member and an elastic member placed between the original document pressing plate and the pressing-contacting sheet member for attaching the original document pressing plate and the pressing-contacting sheet member together. The elastic member is only placed in a vicinity of a lowest surface of a warping shape of the original document pressing plate within a placement range of the pressing-contacting sheet member and the pressing-contacting sheet member is attached to the original document pressing plate only through the elastic member or members.

27 Claims, 36 Drawing Sheets

SCANNING DIRECTION

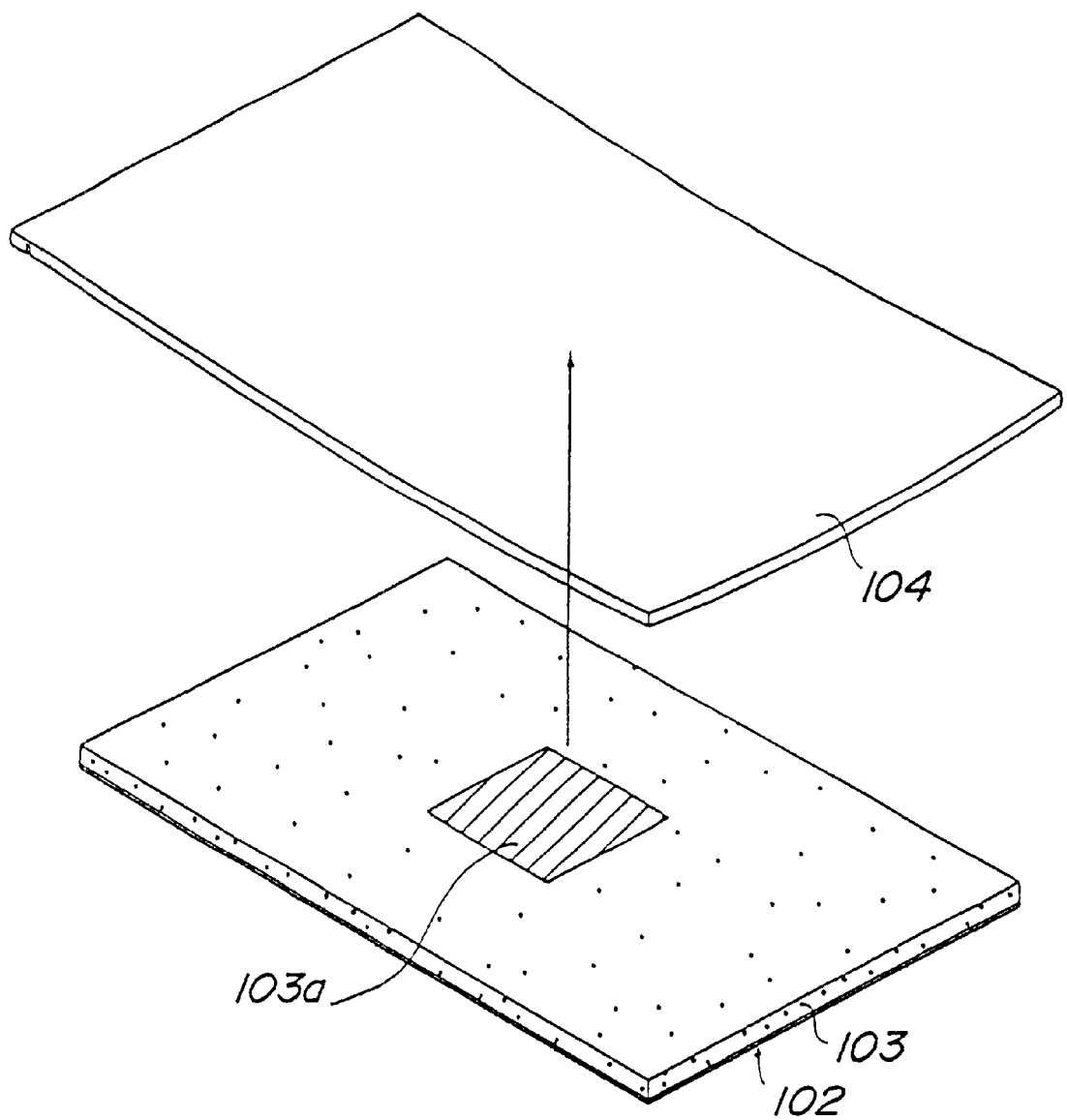
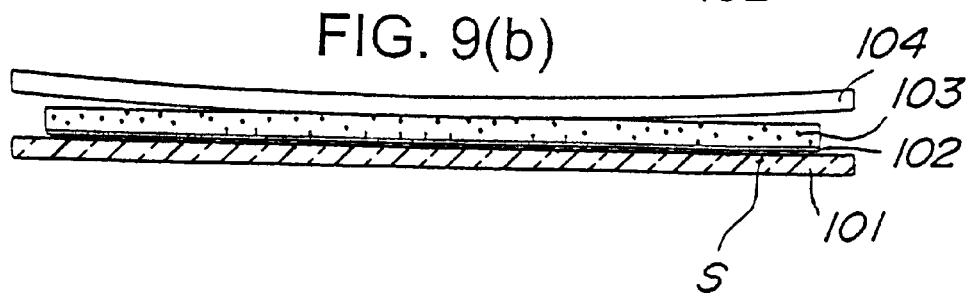

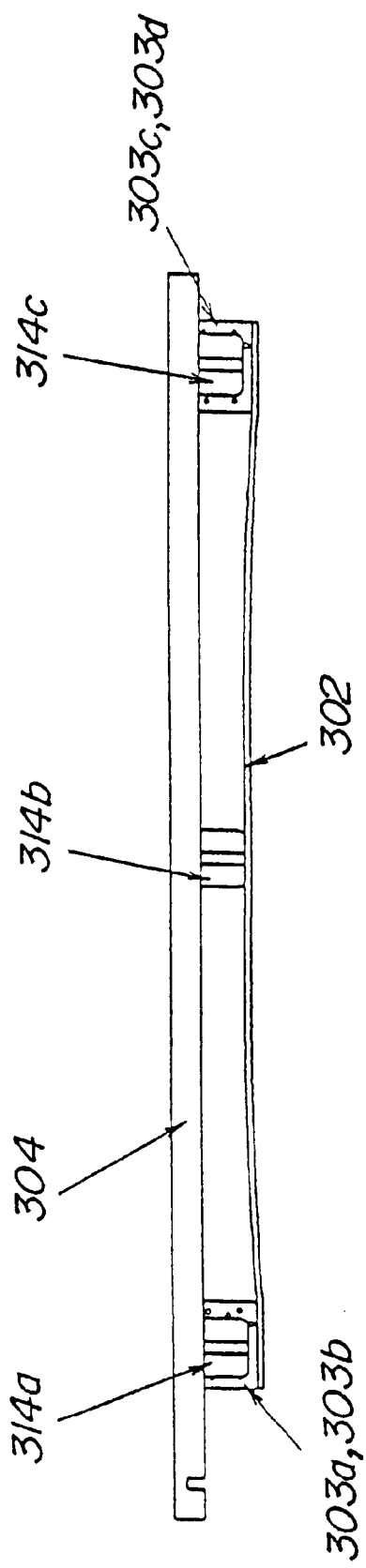

ORIGINAL DOCUMENT HOLDING APPARATUS AND ORIGINAL DOCUMENT READING APPARATUS

BACKGROUND OF THE INVENTION

1. Field of the Invention

The present invention relates to an original document holding apparatus for holding original documents onto a contact glass of a copying machine, an image scanner or the like, to an image reading apparatus having the original document holding apparatus, and especially, to prevention of floating movement of the original document caused by warps or deformations of an original document pressing plate.

2. Description of Prior Art

In an image reading apparatus such as an image scanner or the like, as shown in FIG. 34(a) and FIG. 35(a), an original document S is placed on a contact glass 50, and then a reading means 51 scans to read optically information described in the original document. At this time, the original document S is held by an original document pressing plate 52 so that the original document S does not float upwardly from the contact glass 50.

A pressing-contacting sheet member 54 is attached to this original document pressing plate 52 through an elastic member 53 where resin or the like is generally molded into the original document pressing plate 52 and a sponge as a consecutive foamed body is used for the elastic member 53. A resin sheet is used for the pressing-contacting sheet member 54. As for a method of attachment of each above, it is generally used to apply adhesive tapes such as double-sided tapes onto both surfaces in their entirety of the elastic member 53 to paste the elastic member to the pressingcontacting sheet member 54, and thereafter to attach the elastic member 53 integrally formed with the pressing-contacting sheet member 54 onto the back surface side of the original document pressing plate 52.

When the resin is used for the original document pressing plate 52, however, a warp may occur according to molding conditions. At this time, when an entire surface of the sponge as an elastic member is pasted with adhesive tapes or the like to an original document pressing plate, the sponge and the pressing-contacting sheet member 54 are respectively deformed along the warp of the original document pressing plate 52 as shown in FIG. 34(b) and FIG. 35(b) (FIG. 34 shows a state of warping downwardly; FIG. 35 shows a state of warping upwardly). Molding conditions such as gate position or cooling method can control the direction of warp to some extent, but it is difficult to make the warp amount zero. Here, "a state of warping downwardly" is a state where a center portion of the original document pressing plate is high and its end portions are low, and "a state of warping upwardly" is a state where the end portions of the original document pressing plate are high and its center portion is low.

When these deformations occur in the pressing-contacting sheet member 54, space is made between the pressing-contacting sheet member 54 and the contact glass 50, resulting that placing uniformly the original document S in closely contact with the contact glass 50 becomes difficult. At this time, when the original document S has a curl or the like, the original document becomes afloat.

The floating movement of the original document induces problems causing image degradations such as blurred focus or blockiness caused by changes of the reflective angle of the original document. Particularly, when a contact type image sensor is used as a reading means 51, these influences become obvious.

As a means to solve these problems, there is a method, as shown in FIG. 36(a), that the shape of the elastic member 53 as a sponge is manufactured to fit the shape of the original document pressing plate 52, but this method requires special parts and manufacturing molds, thereby making costs high. There is another method, as shown in FIG. 36(b), that sponges 53a are separately placed on the back surface of the original pressing plate 52; a warping amount of the original document pressing plate 52 is measured; and, according to the amount of the original document pressing plate 52 is measured; and, according to the amount thus measured, a thickness of the sponges 53a is adjusted to keep the flatness of the pressing-contacting sheet member 54.

However, a difference in the warping amount of the original document pressing plate 52 occurs according to the molding conditions, and therefore it is needed to trace, at each time, a warping amount of the original document pressing plate 52 and to prepare sponges having different thicknesses.

Also, there is a method described in Japanese Unexamined Patent Publication (KOKAI) Heisei No. 7-43841 that another original document holding sheet is intermediately placed between the original document pressing plate and the contact glass to press closely an original document onto the contact glass, but this raises such problems as raising cost and as requiring burdensome operations such that both of the original document pressing plate and the original document holding sheet have to be opened and closed each time that an original document is replaced.

SUMMARY OF THE INVENTION

In consideration of the above problems, it is an object of the present invention to provide an image holding apparatus capable of closely contacting a pressingcontacting sheet member with an entire surface of an original document to prevent the original document from floating upwardly, and an image reading apparatus having the original document holding apparatus.

In order to accomplish the above objects, a representative structure according to the present invention of an original document holding apparatus closely contacting an original document with a contact glass surface includes an original document pressing plate for pressingly pushing the original document placed on the contact glass surface, a pressing-contacting sheet member for pressingly contacting the original document with the contact glass surface, and an elastic member or members placed between the original document pressing plate and the pressing-contacting sheet member to attach the original document pressing plate and the pressing-contacting sheet member together, where the elastic member or members are placed, within a placement range of the pressing-contacting sheet member, in a vicinity of the lowest surface in the warping shape of the original document pressing plate as well as where the pressing-contacting sheet member is attached to the original document pressing plate only through the elastic member or members.

With the above structure, the pressing-contacting sheet member can keep its flatness without receiving warp or distortion held by the original document pressing plate. Then, the entire range of the original document can be closely contacted onto the contact glass by the weight of the original document pressing plate. Since the pressing-contacting sheet member is not affected from an amount of warp of the original document pressing plate, quantitative management of the warping amount is not required.

BRIEF DESCRIPTION OF THE DRAWINGS

The above and other objects and features of the invention are apparent to those skilled in the art from the following referred embodiments thereof when considered in conjunction with the accompanied drawings, in which:

FIG. 9(a) is an explanation view showing another attachment structure of the original document pressing plate and the pressing-contacting sheet member;

FIG. 9(b) is a cross-sectional view showing the original document holding section of the original document reading apparatus;

FIG. 23 is an explanation view showing operation of the rib members of the original document pressing plate when a pressing-contacting sheet member has a warp;

DESCRIPTION OF THE PREFERRED EMBODIMENTS

Next, embodiments of the present invention will be explained with reference to the drawings.

First Embodiment

FIG. 1 to FIG. 7 show a first embodiment. FIG. 1(a) shows a schematic structural view of a scanner as an image reading apparatus, and FIG. 1(b) is a cross-sectional view showing a structure of an original document holding section.

First, a structure of the image reading apparatus will be schematically described. As shown in FIG. 1, an original document S mounted on a surface of a contact glass 101 is pressingly contacted with the contact glass surface by an original document pressing plate 104 through a pressing-contacting sheet member 102 and elastic members 103 made of a consecutive foamed body.

Figure 1A:
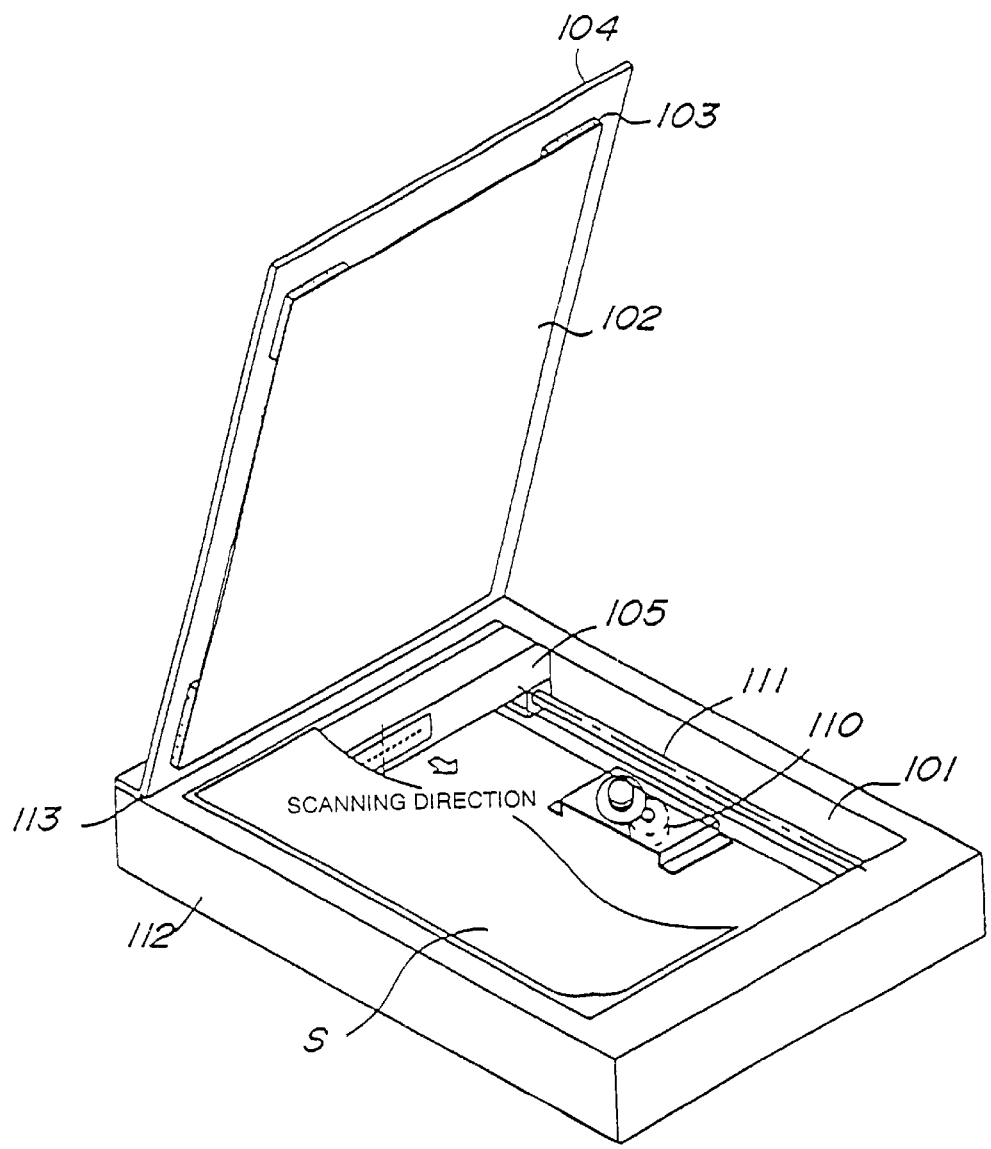
FIG. 1(a) is a perspective view showing an image reading apparatus according a first embodiment of the present invention.
Figure 1B:
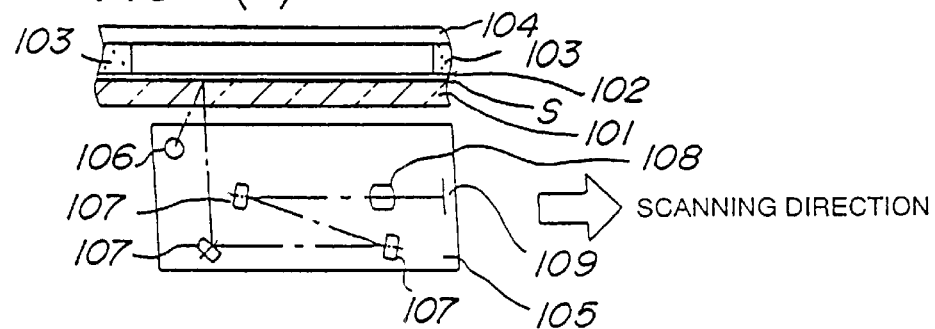
FIG. 1(b) is a cross-sectional view showing an original document holding section of the image reading apparatus.

Information described in the original document S thus pressingly contacted with the contact glass surface is then read by a reading means 105. Specifically, as shown in FIG. 1(b), the original document S is linearly irradiated by a light source 106 such as a lamp, LED or the like, and then light reflected by the original document travels through mirrors 107 and a lens or lenses 108 to form an image on a photoelectric conversion element 109. The aforementioned light source 106, the mirror 107, the lens 108, and the photoelectric conversion element 109 are structured as a unit so as to move (scan), driven by a motor 110, relatively to the original document S, along a guide 111 in a direction perpendicular to a longitudinal direction of the photoelectric conversion element 109, thus to read optically the planeform original document image.

It is to be noted that, as the lens 108 mentioned above, a rod lens array using a contact type image sensor may be used.

Next, an original document holding structure by the original document pressing plate 104 will be specifically described. The original document pressing plate 104 is rotatably attached to a main body of the apparatus 112 on a rotary support 113. In this embodiment, ABS resin is molded into the original document pressing plate 104, and a moltprene block as an elastic block is used for the elastic members 103a, and a PET resin sheet is used for the pressing-contacting sheet member 102.

Each of the elastic members 103 is attached to each of four corners of the back surface of the original document pressing plate 104, in a separating manner, in a vicinity of a lowest surface of the original document pressing plate 104 within a placement range of the pressing-contacting sheet member 102, and the pressing-contacting sheet member 102 is attached with double-sided tapes to the original document side of the elastic member 103.

Figure 2A:
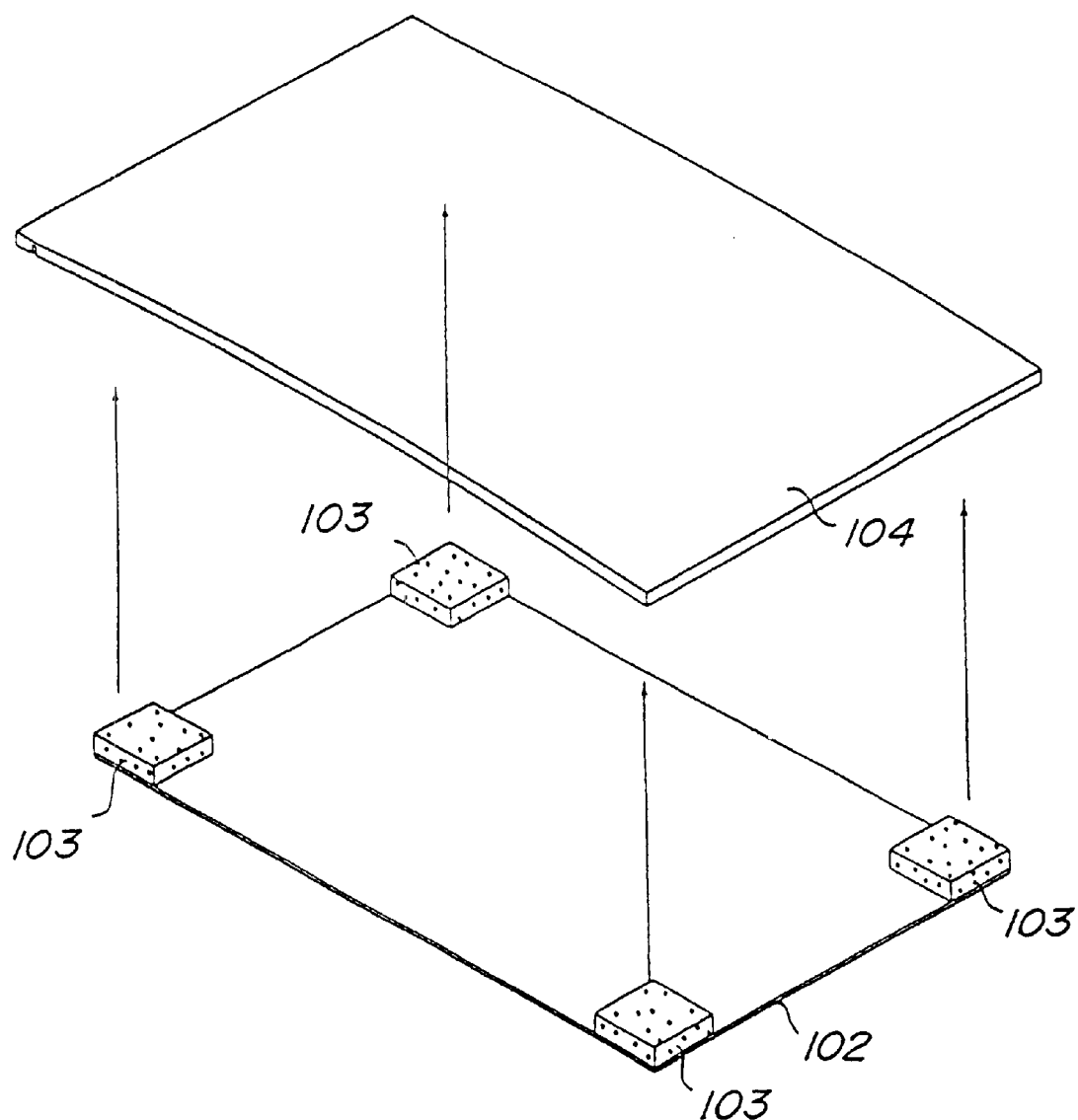
FIG. 2(a) is an explanation view showing a method of attaching, by using elastic blocks, an original document pressing plate and a pressing-contacting sheet member in the original document reading apparatus.
Figure 2B:
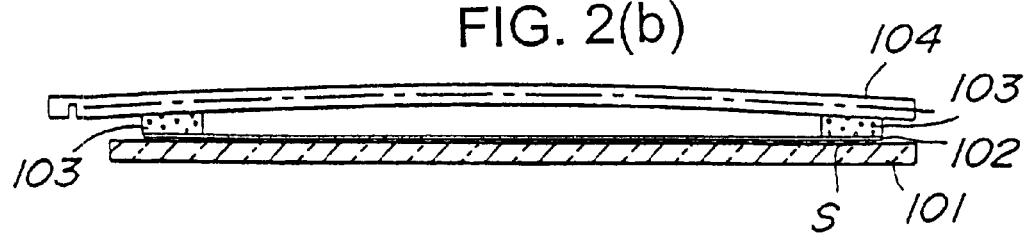
FIG. 2(b) is a cross-sectional view showing the original document holding section of the original document reading apparatus.

When the original document pressing plate 104 is molded of resin, a warp might occur as shown in FIGS. 2(a) and 2(b) (FIG. 2 shows an example having downward warp although there are cases of upward and downward warps), but, as mentioned above, the pressing-contacting sheet member 102 is held by four corners in the vicinities of the lowest portions of the warp, and therefore, the center portion is not affected from the shape of the original document pressing plate 104. Due to this, the pressing-contacting sheet member 102 is closely contacted with the contact glass 101, through the entire range, by its own flatness, without following the shape of the original document pressing plate 104. Because of this, undulations, such as curls or the like, of the original document S placed on the contact glass surface are flattened by the weight of the original document pressing late 104 as well as the flatness and rigidity of the pressing-contacting sheet member 102, and then the original document S becomes closely contacted with the contact glass surface through the entire range.

In this embodiment, the flatness of the pressing-contacting sheet member 102 is not affected from an amount of warp of the original document pressing plate 104, and therefore a warp amount is not required to be managed quantitatively as long as controlling in a warping direction is conducted.

Figure 3A:
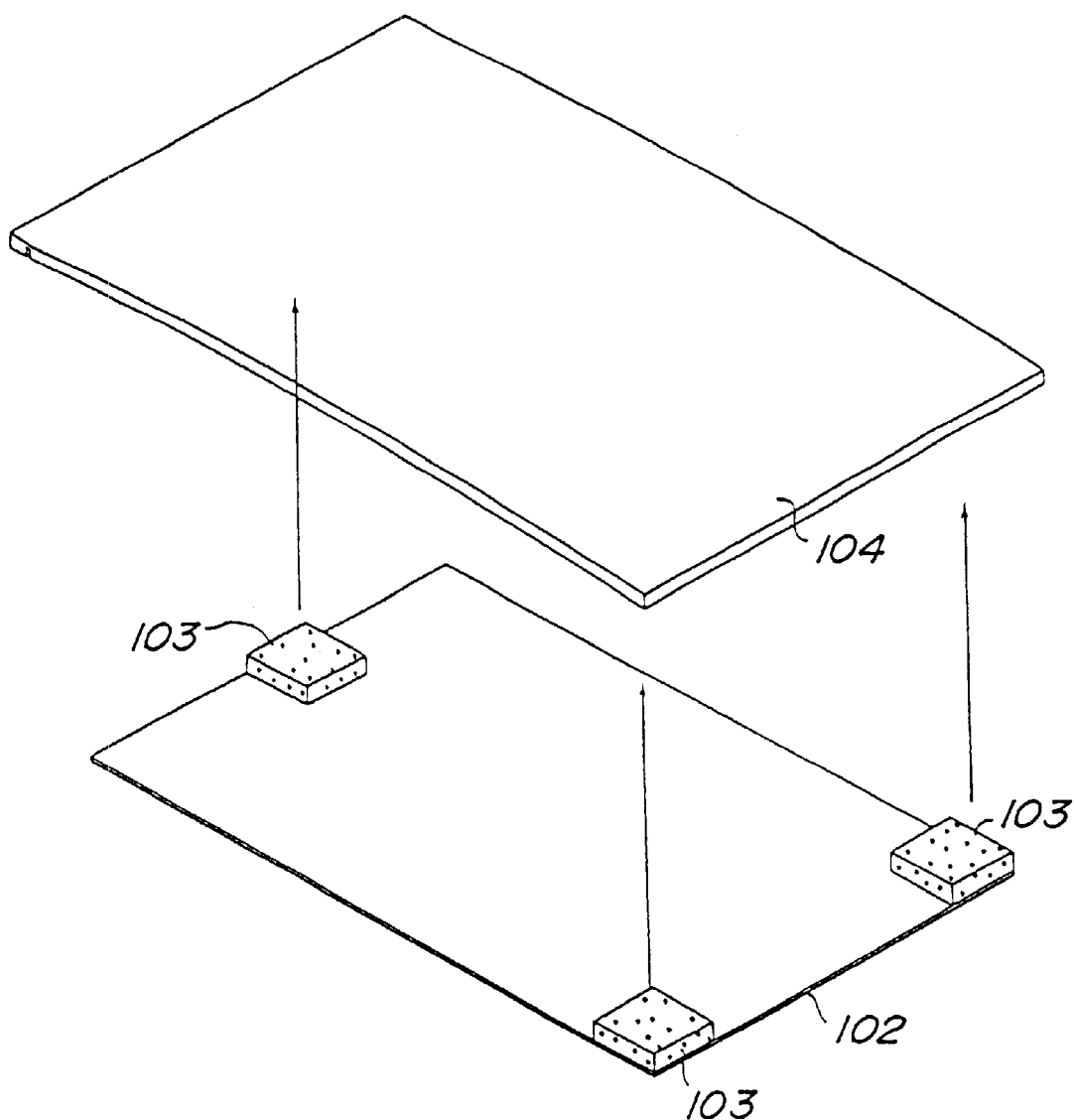
FIG. 3(a) is an explanation view showing another attachment structure of the original document pressing plate and the pressing-contacting sheet member.
Figure 3B:
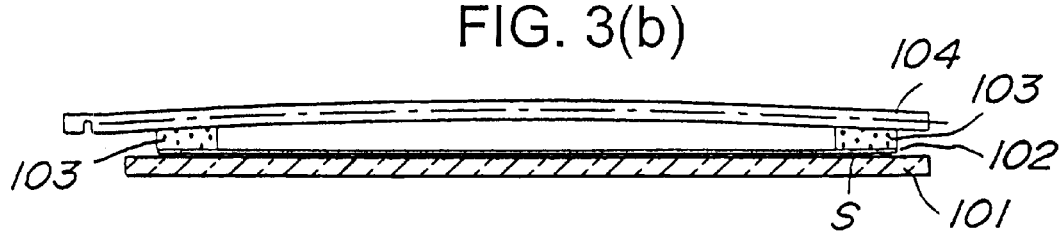
FIG. 3(b) is a cross-sectional view showing the original document holding section of the original document reading apparatus.

It is to be noted that, in this embodiment, moltprene is used as the elastic members 103, but the invention is not limited to this. That is, a coil spring may be used as the elastic member. In addition, since the pressing-contacting sheet member 102 is just required to be a sheet member having sufficient flatness and rigidity for pressingly contacting the original document S with the contact glass surface, a vinyl chloride sheet or a PPE sheet, for example, may be used. As for the placing spots of the elastic members 103, at least two spots are required to be placed in the vicinity of the lowest surface of the warping shape of the original document pressing plate 104, so the same effect can be obtained, even when the placing spots are three as shown in FIGS. 3(a) and 3(b).

Figure 4A:
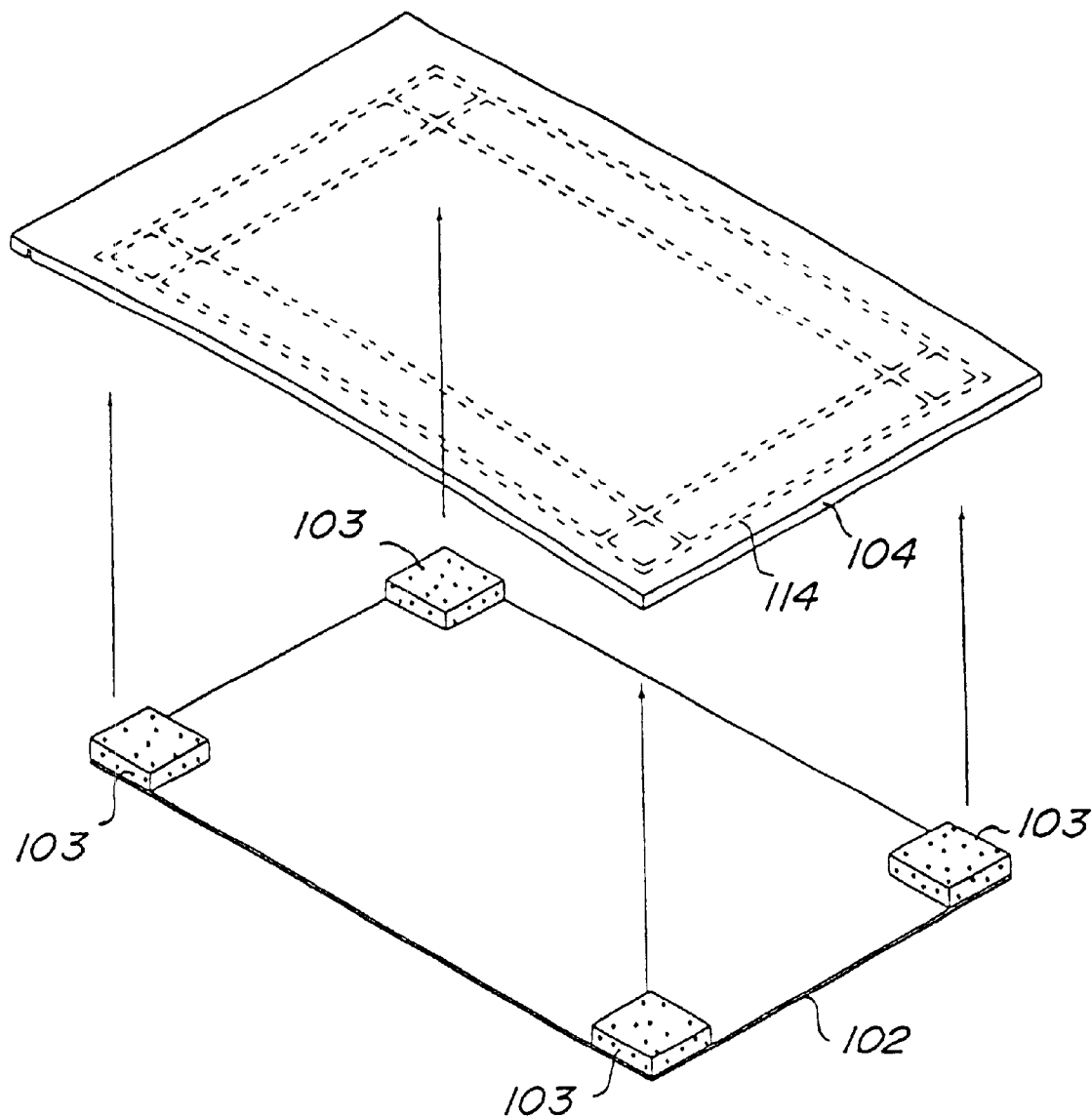
FIG. 4(a) is an explanation view showing another attachment structure of the original document pressing plate and the pressing-contacting sheet member.
Figure 4B:
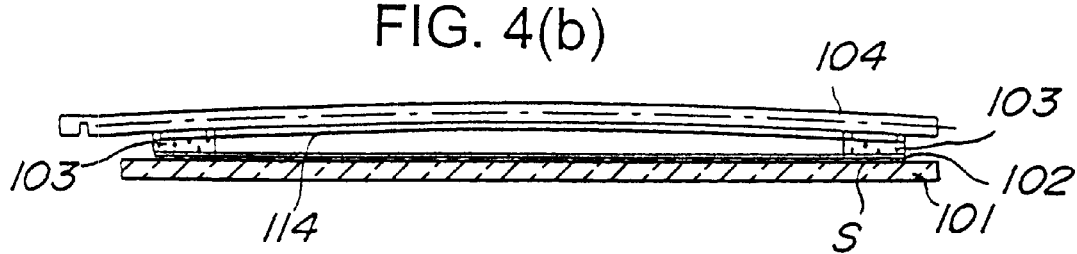
FIG. 4(b) is a cross-sectional view showing the original document holding section of the original document reading apparatus.
Figure 5A:
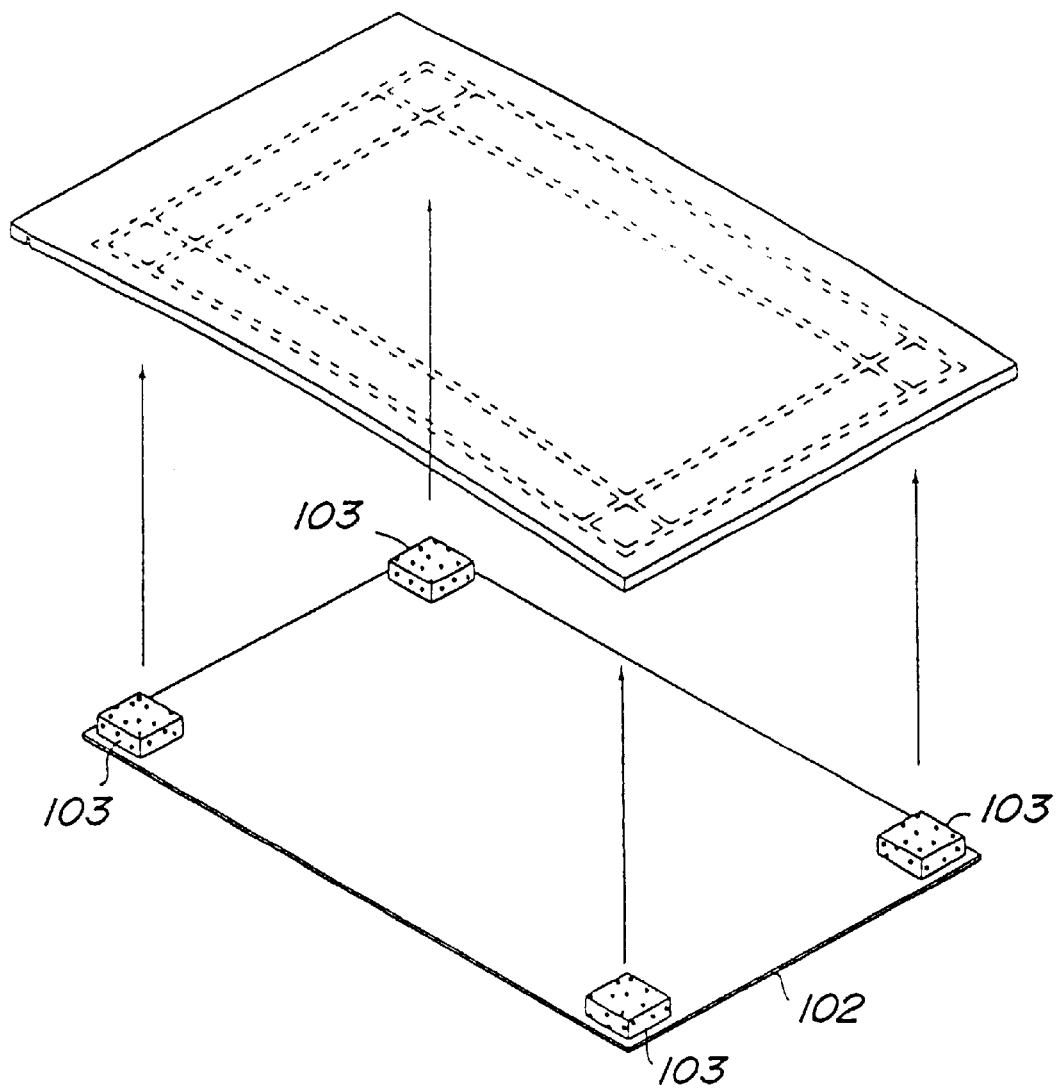
FIG. 5(a) is an explanation view showing another attachment structure of the original document pressing plate and the pressing-contacting sheet member.
Figure 5B:
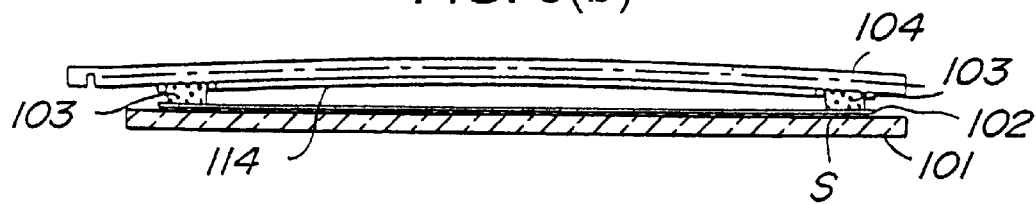
FIG. 5(b) is a cross-sectional view showing the original document holding section of the original document reading apparatus.

On the back surface of the original document pressing plate 104, a reinforcing rib is usually placed. In this case, the rib surface also follows the warping shape of the original document pressing plate 104, as shown in FIGS. 4(a) and 4(b), the elastic members 103 may be placed in the lowest surfaces of the surface of a rib 114. In addition, the same effect can be obtained by setting the height (thickness) of the elastic member 103 higher than that of the rib 114 and placing the elastic member in the vicinity of the lowest surface of the warping shape of the original document pressing plate 104 except the rib portion, as shown in FIGS. 5(a) and 5(b).

The placing points of these elastic members 103 are desirably positioned on the same level as that of the contact glass surface serving as a standard when the original document pressing plate 104 is closed, but when a small difference in level (errors) occurs, there is no problem because such difference is absorbed by stretching and contraction of the elastic members 103. In addition, all of the elastic members 103 are desirably structured to have the same height (thickness), but if there is a difference in height, no problem occurs as long as the amount is small.

Figure 6A:
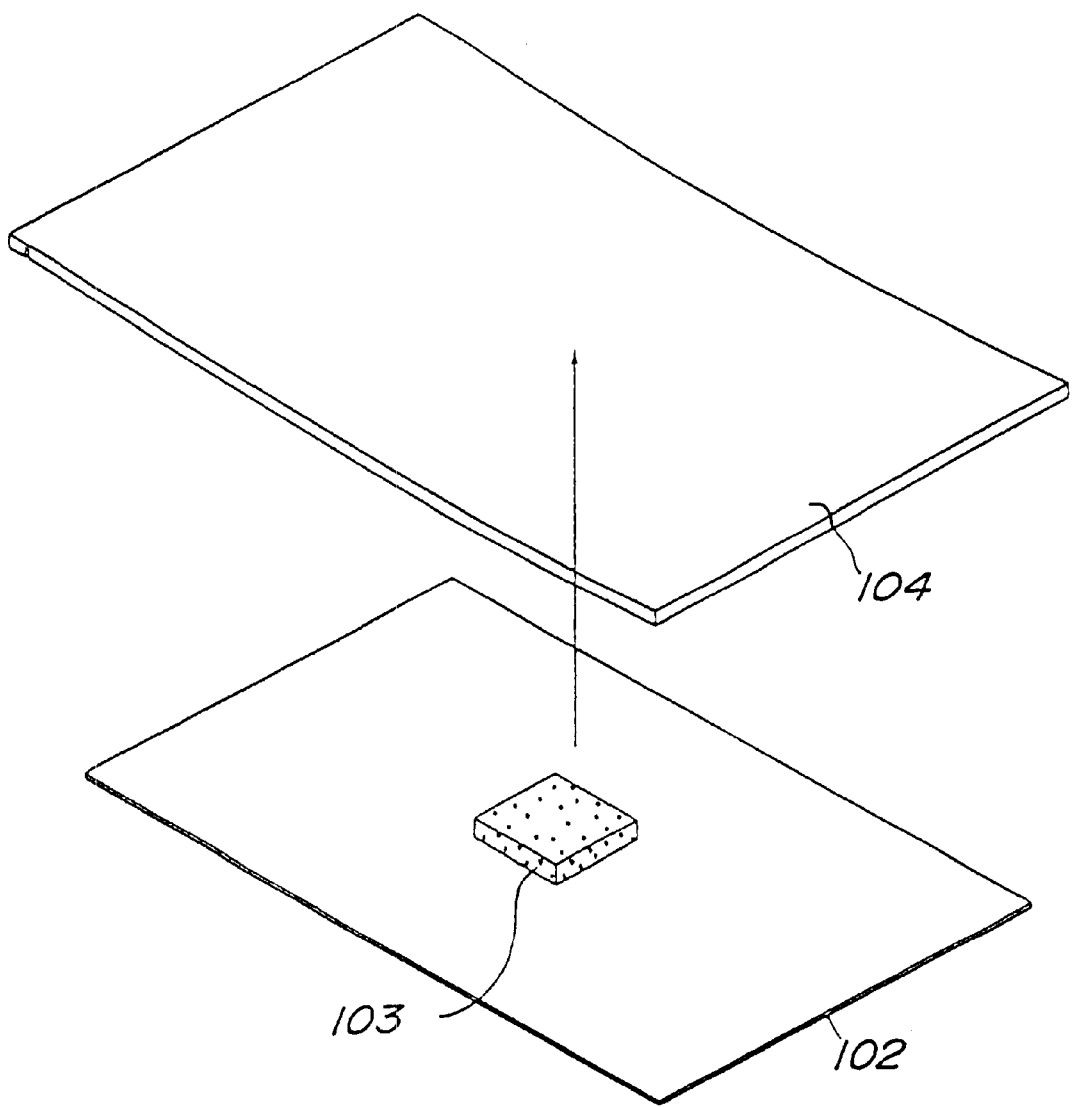
FIG. 6(a) is an explanation view showing another attachment method of the original document pressing plate and the pressing-contacting sheet member.
Figure 6B:
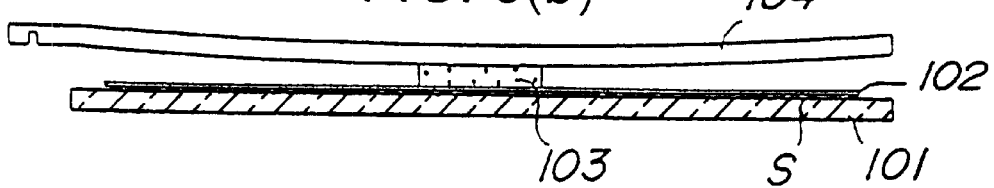
FIG. 6(b) is a cross-sectional view showing the original document holding section of the original document reading apparatus.

FIGS. 6(a) and 6(b) show an example that the original pressing plate 104 has an upward warp with respect to the original document S. In this case, the elastic member 103 formed of moltprene is placed in the center which is the lowest surface of the original document pressing plate 104, and the pressing-contacting sheet member 102 is attached to the original document side of the elastic member 103.

Figure 7A:
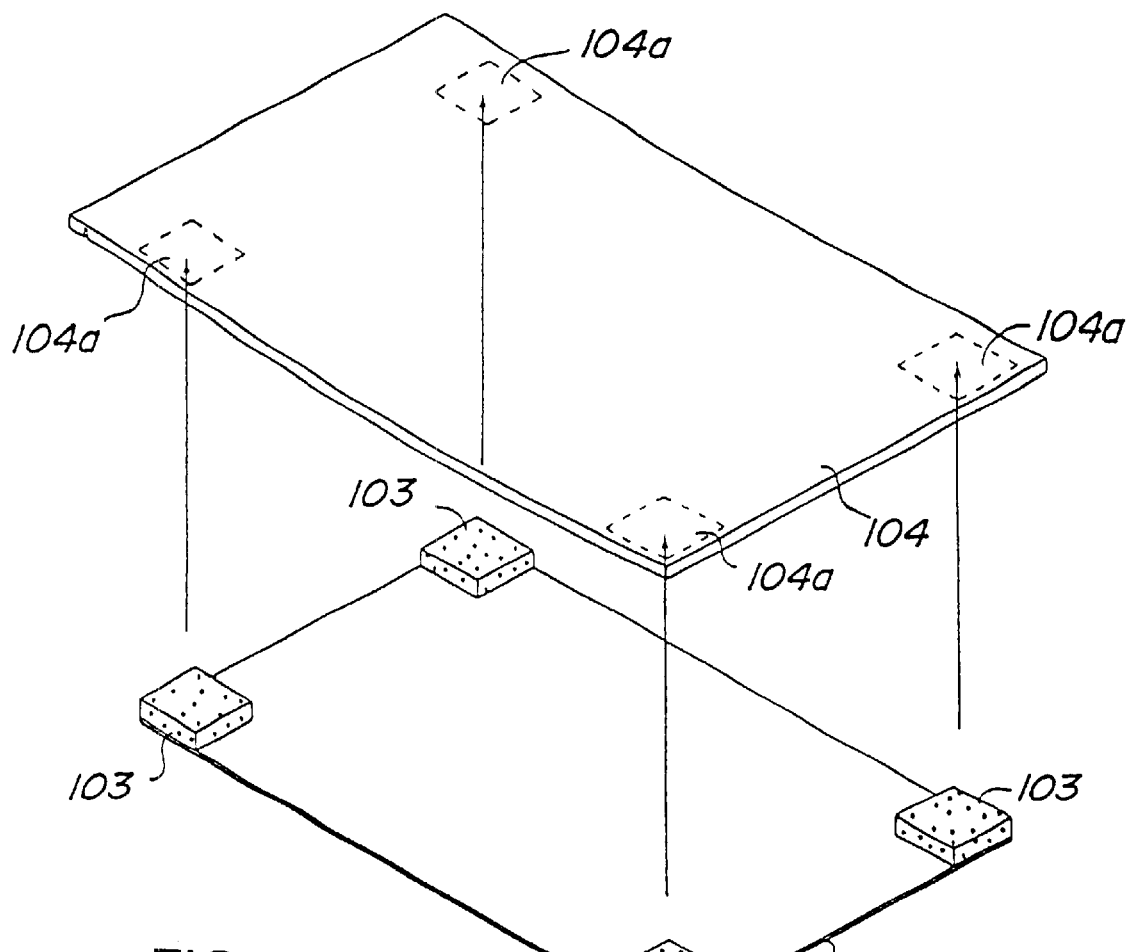
FIG. 7(a) is an explanation view showing another attachment structure of the original document pressing plate and the pressing-contacting sheet member.
Figure 7B:
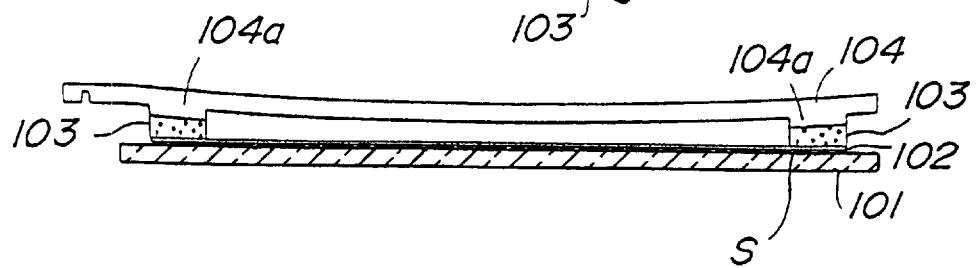
FIG. 7(b) is a cross-sectional view showing the original document holding section of the original document reading apparatus.

In this case, as well, the pressing-contacting sheet member 102 is closely contacted with the contact glass 101, through the entire range, by its ow flatness, without following the shape of the original document pressing plate 104. As a result, the original document S on the surface of the contact glass 101 can be contacted, across its entire range, with the contact glass 101. It is to be noted that, in FIG. 6, the elastic member 103 is placed only on the center of the original document pressing plate 104, but the same effect can be obtained by forming, in the circumferential portion of the original document pressing plate 104, projecting surfaces 104a which project more downwardly than that of the height of the center and then placing the elastic members 103 onto the projecting surfaces 104a as shown in FIGS. 7(a) and 7(b).

Second Embodiment

Figure 8A:
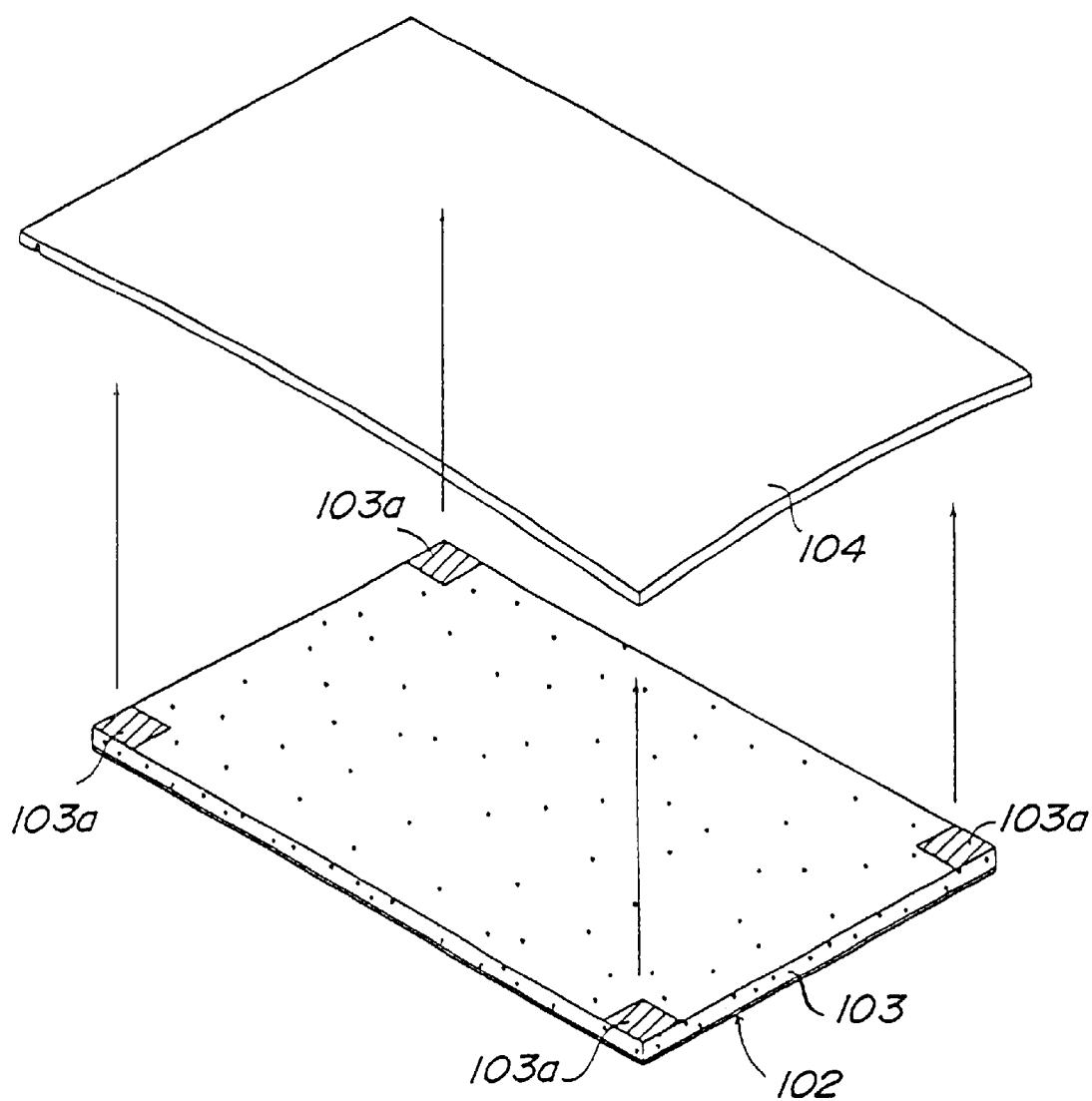
FIG. 8(a) is an explanation view showing an attachment method of an original document pressing plate and a pressing-contacting sheet member by using an elastic sheet in an image reading apparatus according to a second embodiment of the present invention.
Figure 8B:
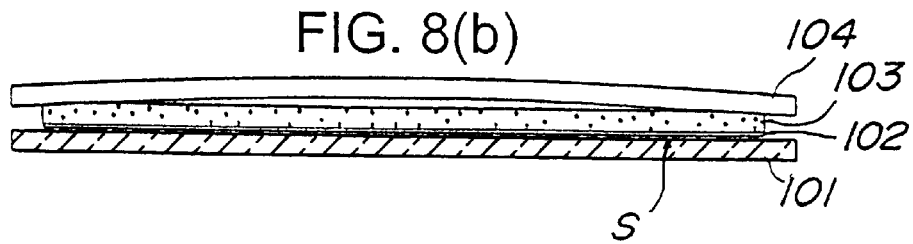
FIG. 8(b) is a cross-sectional view showing an original document holding section of the image reading apparatus.

FIGS. 8(a) and 8(b) show a second embodiment of the present invention. That is, the original document pressing plate 104 has downward warp with respect to the original document surface, and a moltprene sheet of a consecutive foamed body as an elastic sheet is used for the elastic member 103. In other words, the pressing-contacting sheet member 102 is attached by using double-sided tapes to the original document side of the consecutive foamed body to be formed integrally with the consecutive foamed body. Then the consecutive foamed body as the elastic member 103 is attached to the original document pressing plate 104 by attachment portions 103a formed in the four corners which are the lowest surfaces of the warping shape of the original document pressing plate within the placement range of the foam. The pressing-contacting sheet member 102 can keep its flatness since the member 102 does not follow the shape of the original document pressing plate 104, and the original document S can be contacted, across its entire range, with the surface of contact glass 101 by the weight of the original document pressing plate 104. In this embodiment, the pressing-contacting sheet member 102 is integrally formed with the elastic member 103 as a consecutive foamed body, so the weight and flatness of the elastic member 103 can be utilized. As a result, an effect of contacting the original document S closely with the contact glass 101 becomes further higher than that of the first embodiment.

FIGS. 9(a) and 9(b) show an example when the original document pressing plate 104 has upward warp with respect to the original document surface. In other words, the original document pressing plate 104 has a shape with the center hanging downwardly, and the attachment portion 103 is placed in one site in the vicinity of the center which is the lowest surface of the warping shape of the original document pressing plate 104. In this case as well, the pressing-contacting sheet member 102, without following the shape of the original document pressing plate 104, can make the original document S, across its entire range, closely in contact with the surface of the contact glass 101 by the weight of the original document pressing plate 104.

Third Embodiment

Figure 10A:
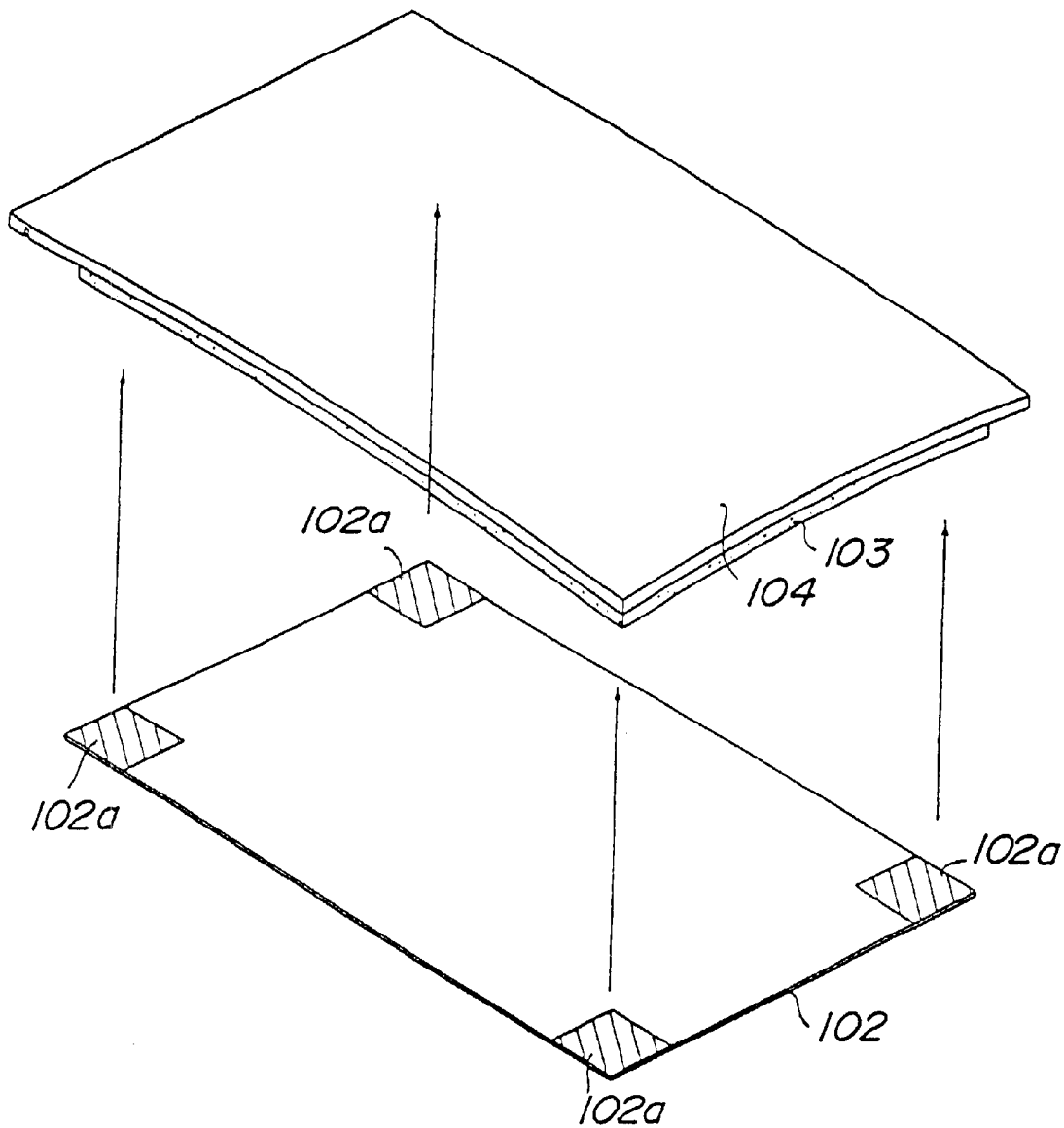
FIG. 10(a) is an explanation view showing a method of closely contacting an elastic sheet with an original document pressing plate to be attached thereafter to a pressing-contacting sheet member in an image reading apparatus according to a third embodiment of the present invention.
Figure 10B:
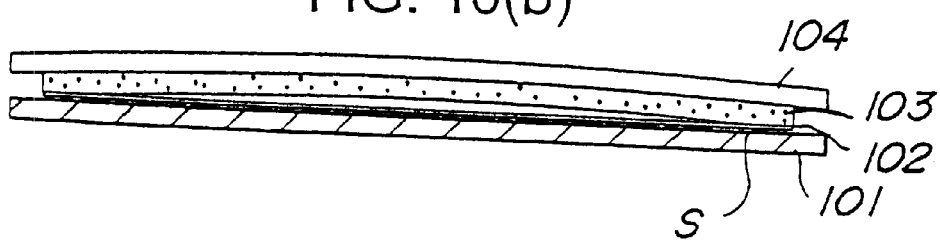
FIG. 10(b) is a cross-sectional view showing an original document holding section of the original document reading apparatus.

FIGS. 10(a) and 10(b) show a third embodiment of the present invention. That is, the original document pressing plate 104 has downward warp with respect to the original document surface. The elastic member 103 formed of the consecutive foamed body is attached entirely to the back surface of the original document pressing plate 104. Thus, the elastic member 103 follows the shape of the warp of the original document pressing plate 104. On the other hand, in the pressing-contacting sheet member 102, attachment portions 102a are formed respectively in the vicinity of the four corners which are the lowest surfaces of the elastic member 103. In this case, the pressing-contacting sheet member 102 is held by the four corners, and the center is not affected from interference of the shape of the original document pressing plate 104 and the elastic member 103. Because of this, the pressing-contacting sheet member 102, without following the shape of the original document pressing plate 104, can make the original document S, across its entire range, closely in contact with the surface of the contact glass 101 by the weight of the original document pressing plate 104.

Figure 11A:
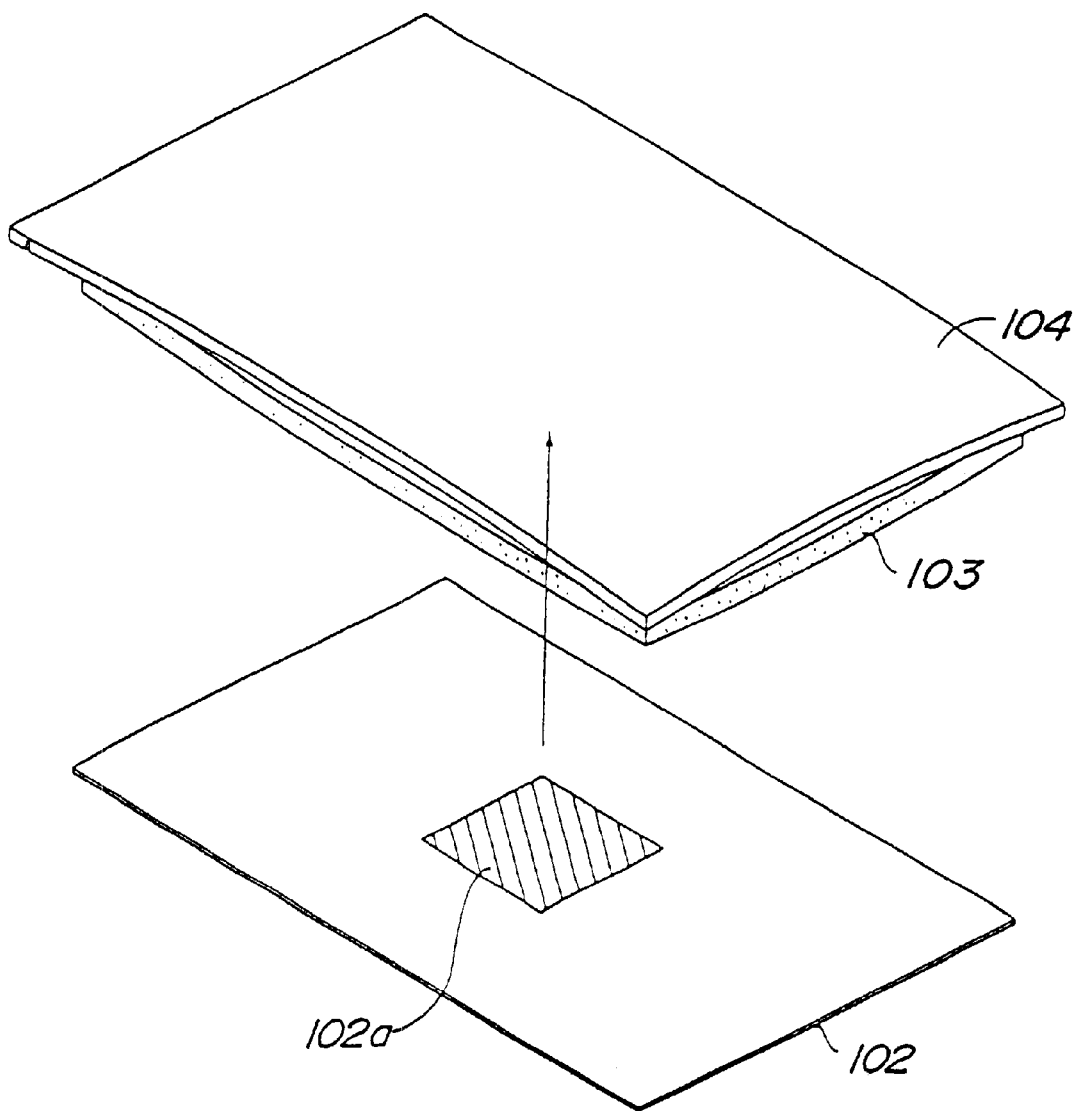
FIG. 11(a) is an explanation view showing another attachment method of the original document pressing plate and the pressing-contacting sheet member.
Figure 11B:
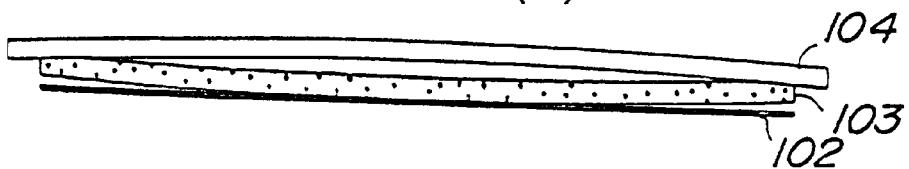
FIG. 11(b) is a cross-sectional view showing the original document holding section of the original document reading apparatus.
Figure 12A:
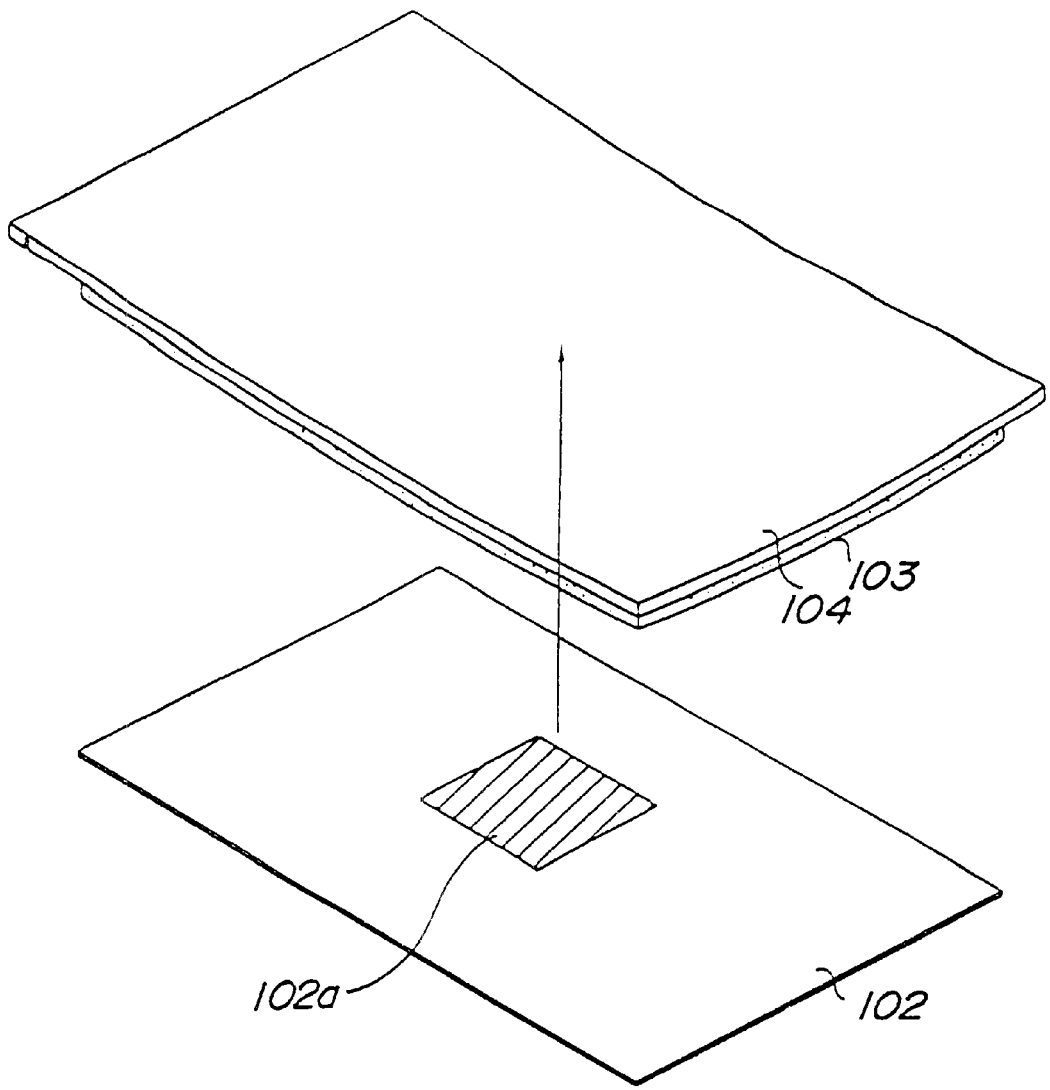
FIG. 12(a) is an explanation view showing another attachment structure of the original document pressing plate and the pressing-contacting sheet member.
Figure 12B:
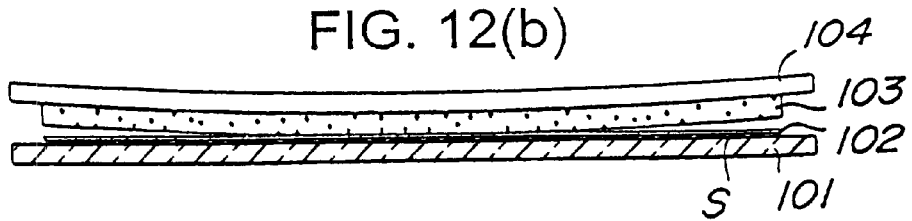
FIG. 12(b) is a cross-sectional view showing the original document holding section of the original document reading apparatus.

In addition, as shown in FIGS. 11(a) and 11(b), when the elastic member 103 as the consecutive foamed body has upward curl or the like by its own, the flatness of the pressing-contacting sheet member 102 can be kept by providing the attachment portion 102a with the pressing-contacting sheet member 102 in the center portion which is the lowest surface of the warping shape of the elastic member 103. It is to be noted that FIGS. 12(a) and 12(b) is an example when the original document pressing plate 104 has an upward warp with respect to the original document surface, and the same effect can be obtained also in this case, by providing the attachment portion 102a with the pressing-contacting sheet member 102 in vicinity of the center portion which is the lowest surface of the warping shape of the elastic member 103.

In the present invention thus structured as mentioned above, the pressingcontacting sheet member can keep its flatness without receiving warp or distortion held by the original document pressing plate. Then, the entire range of the original document can be closely contacted with the contact glass by the weight of the original document pressing plate. In addition, since the pressing-contacting sheet member is not affected from an amount of warp of the original document pressing plate, quantitative management of the warping amount is not required.

Forth Embodiment

Figure 13A:
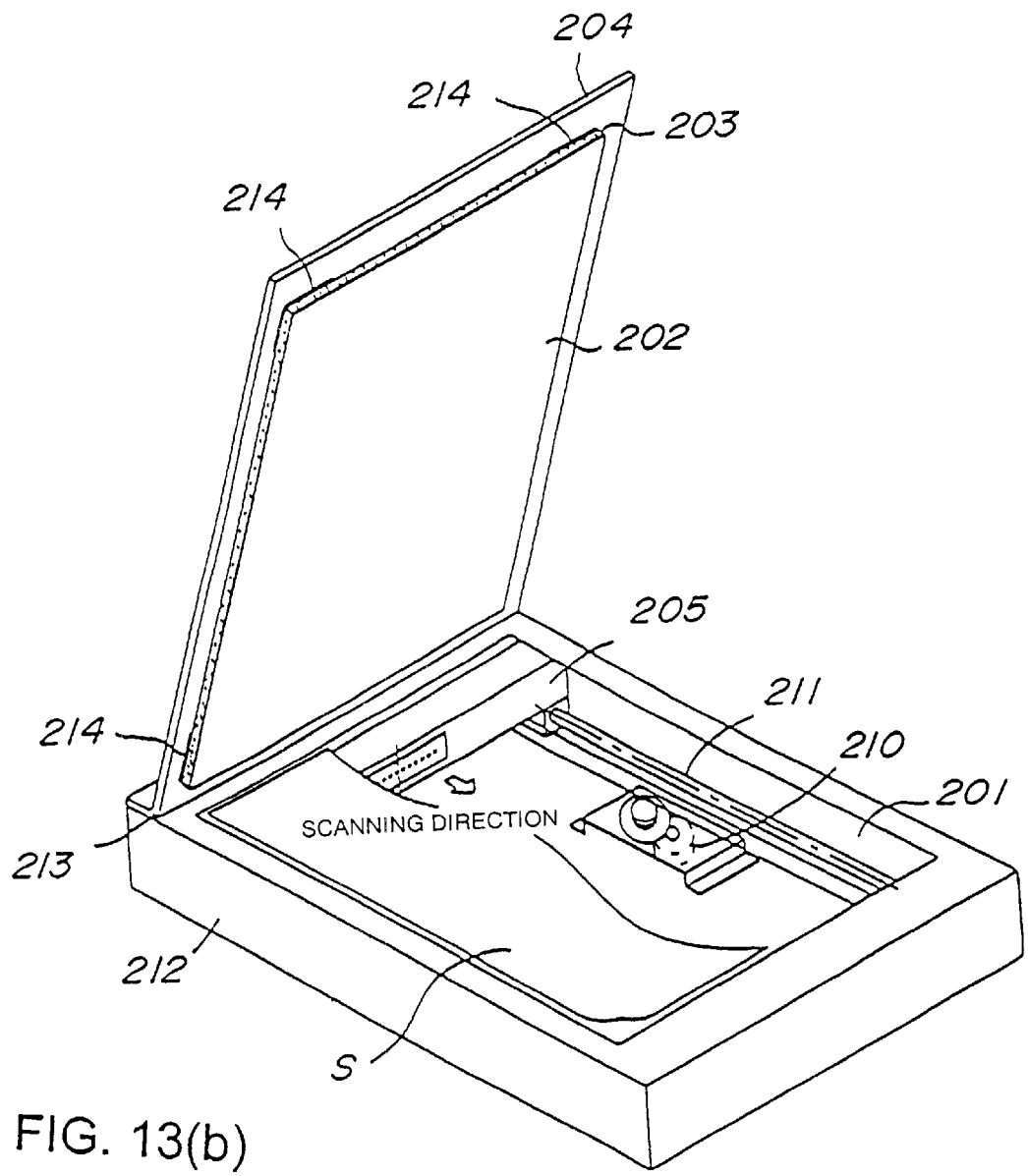
FIG. 13(a) is a perspective view showing an image reading apparatus according a fourth embodiment of the present invention.
Figure 13B:
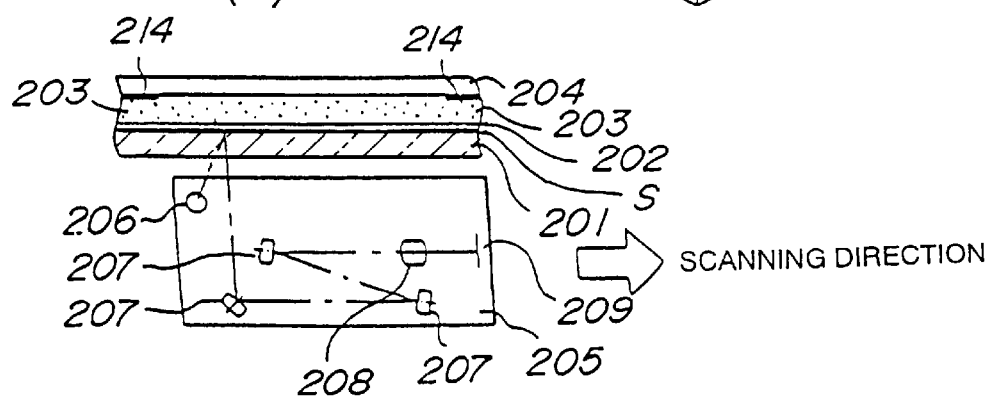
FIG. 13(b) is a cross-sectional view showing an original document holding section of the image reading apparatus.

A fourth embodiment will be described with reference to FIG. 13 to FIG. 16. Here, FIG. 13 shows a scanner as an image reading apparatus where (a) shows the perspective view and (b) shows the cross-sectional view. FIG. 14 is an explanation view of the attachment portion between the original document pressing plate and the elastic member according to this embodiment, and FIG. 15 is an explanation view showing another example of the elastic member, and FIG. 16 is an explanation view in the case that the original document pressing plate has a rib.

First, a structure of the image reading apparatus will be roughly described. As shown in FIG. 13, an original document S mounted on a surface of a contact glass 201 is pressingly contacted with the contact glass surface by an original document pressing plate 204 through a pressing-contacting sheet member 202 and an elastic member 203 made of a consecutive foamed body.

Information described in the original document S thus pressingly contacted with the contact glass surface is then read by a reading means 205. Specifically, as shown in FIG. 201(b), the original document S is linearly irradiated by a light source 206 such as a lamp, LED or the like, and then light reflected by the original document travels through mirrors 207 and a lens or lenses 208 to form an image on a photoelectric conversion element 209. The aforementioned light source 206, the mirrors 207, the lens 208, and the photoelectric conversion element 209 are structured as a unit so as to move (scan), driven by a motor 210, relatively to the original document S, along a guide 211 in a direction perpendicular to a longitudinal direction of the photoelectric conversion element 209, thus to read optically the plane-form original document image.

It is to be noted that, as the lens 208 mentioned above, a rod lens array using a contact type image sensor may be used.

An original document holding structure by the original document pressing plate 204 will be specifically described. The original document pressing plate 204 is rotatably attached to a main body of the apparatus 212 on a rotary support 213. In this embodiment, ABS resin is molded into the original document pressing plate 204, and moltprene is used for the elastic member 103. Used for the pressing-contacting sheet member 202 is a resin sheet such as PET or the like having a thickness from 0.5 mm to 2 mm, a flatness of 1 mm or less across the whole area, a flexural rigidity of 200 kgf·mm² or higher, and a flexibility following the flat surface of the contact glass 201.

Then the elastic member 203 is attached by attachment portions 214 provided in four corners of the back surface of the original document pressing plate 204, in a separating manner, in a vicinity of the lowest surface of the original document pressing plate 204 within a placement range of the pressing-contacting sheet member 202, and the pressing-contacting sheet member 202 is attached with double-sided tapes to the original document side of the elastic member 203.

Figure 14A:
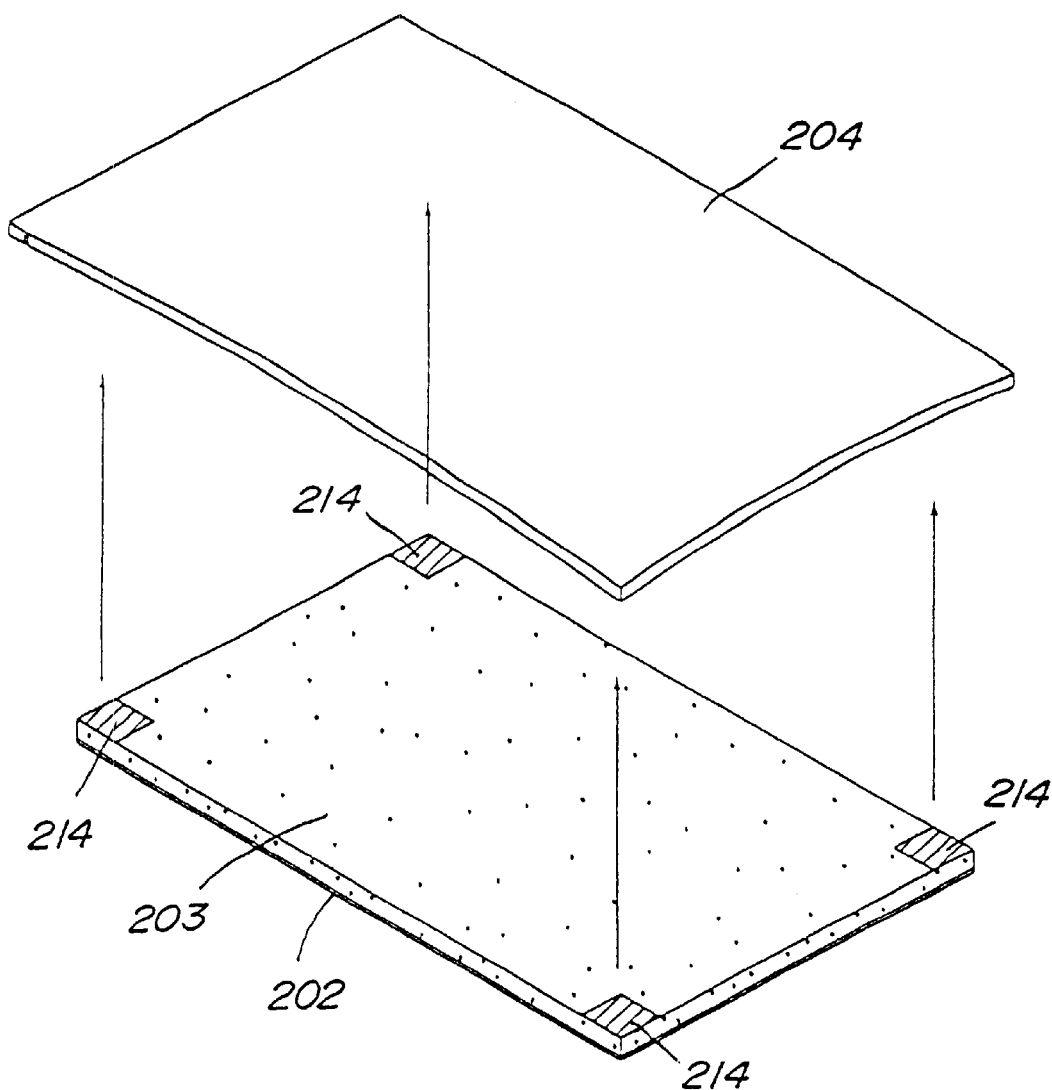
FIG. 14(a) is an explanation view showing a method of closely contacting an elastic sheet with a pressing-contacting sheet member and then attaching to an original document pressing plate.
Figure 14B:
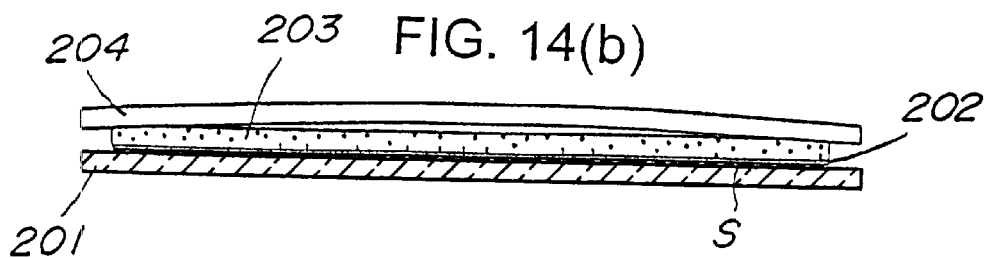
FIG. 14(b) is a cross-sectional view showing the original document holding section of the original document reading apparatus.
Figure 15A:
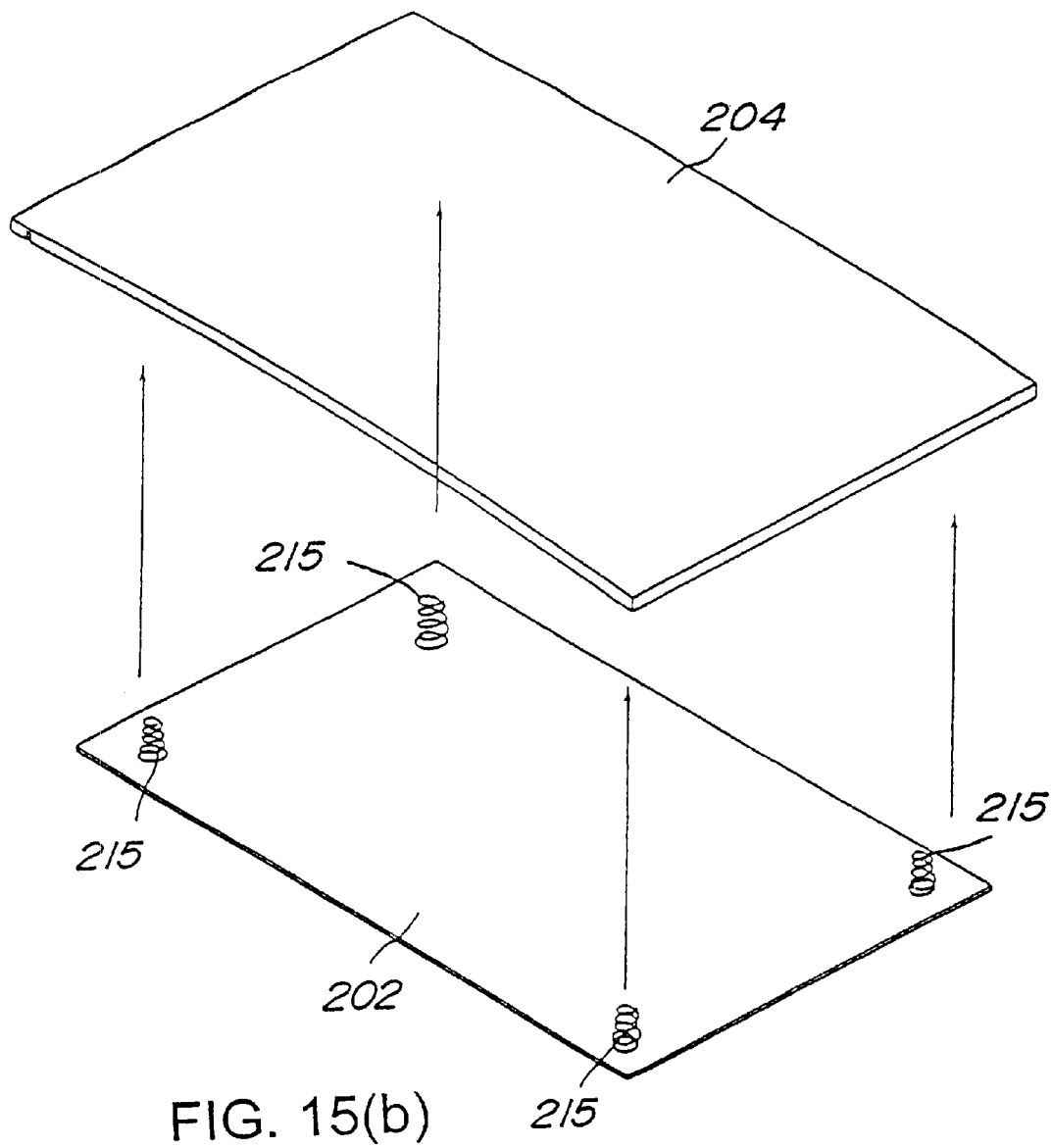
FIG. 15(a) is an explanation view showing another attachment structure of the original document pressing plate and the pressing-contacting sheet member.
Figure 15B:
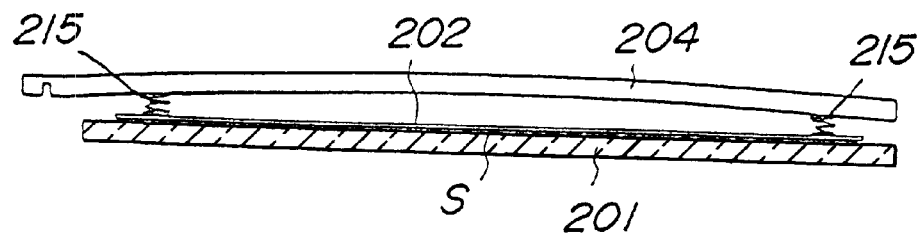
FIG. 15(b) is a cross-sectional view showing the original document holding section of the original document reading apparatus.

When the original document pressing plate 204 is molded of resin, a warp might occur as shown in FIGS. 14(a) and 14(b) (in FIG. 13, the center portion is warped upwardly with respect to the end portions), but the pressing-contacting sheet member 202 is held by four corners as mentioned above, and therefore, the center portion is affected from interference of the pressing plate shape.

Due to this, the pressing-contacting sheet member 202 is closely contacted with the contact glass 201, through the entire range, by the own thickness, flatness, rigidity, and flexibility as mentioned above, without following the warp of the original document pressing plate 204. Because of this, undulations, such as curls or the like, of the original document S placed on the contact glass surface are flatten by the weight of the original document pressing plate 204 and the flatness, rigidity or the like of the pressing-contacting sheet member 202, and then the original document S, across its entire range, becomes closely contacted with the contact glass surface. In this embodiment, the flatness of the pressing-contacting sheet member 202 is not affected from an amount of warp of the original document pressing plate 204, and therefore a warp amount is not required to be managed quantitatively as long as controlling in a warping direction is conducted.

Here, the pressing-contacting sheet member 202 desirably has the thickness, flatness, and rigidity as mentioned above. In other words, when the thickness of the pressing-contacting sheet member 202 is less than 0.5 mm, if the original document has a curl, the pressing-contacting sheet member 202, incapable of resisting the elasticity of the original document, cannot fully push the original document. When it is more than 2 mm, the rigidity of the pressing-contacting sheet member by itself becomes strong, thereby incapable of following the contact glass 201. In addition, when the flatness is greater than 1 mm, the pressing-contacting sheet member 202, even if having flexibility, cannot fully follow the contact glass surface, thus generating spaces between the pressing-contacting sheet member 202 and the contact glass 201. Furthermore, the flexural rigidity is smaller than 200 kgf·mm$^2$, the pressing-contacting sheet member 202 is too soft to be closely contacted with the contact glass 201 because ruffles or the like are formed in the pressing-contacting sheet member in itself.

It is to be noted that, in this embodiment, moltprene is used as the elastic members 203, but the invention is not limited to this. That is, as shown in FIG. 15, coil springs 215 may be used as the elastic members so that the four corners of the pressing-contacting sheet member 202 are attached through the coil springs 215 to the original document pressing plate 204.

In addition, since the pressing-contacting sheet member 202 is just required to be a sheet member having sufficient flatness and rigidity for pressingly contacting the original document S with the contact glass surface, a vinyl chloride sheet or a PPE sheet, for example, may be used.

Figure 16A:
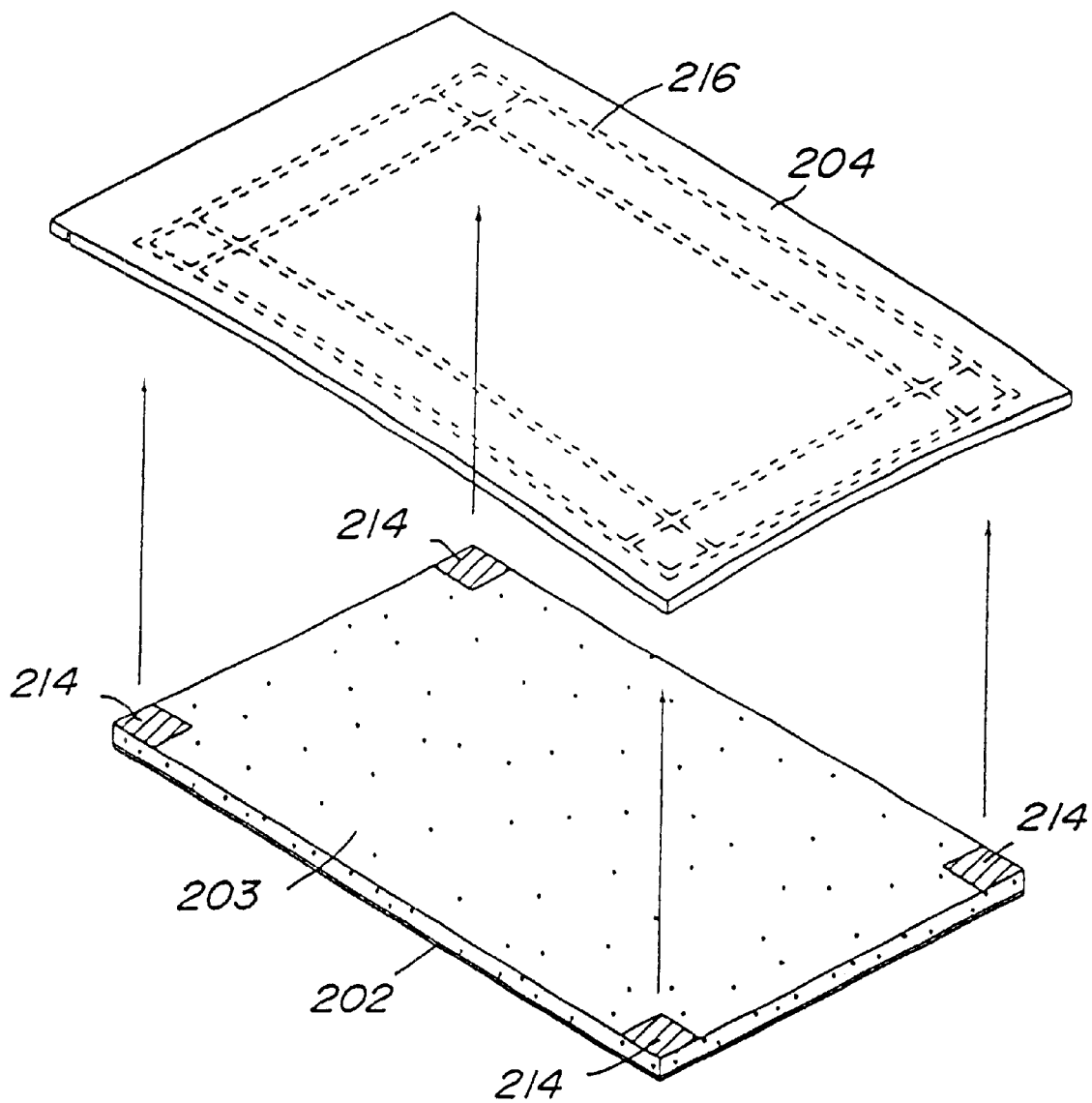
FIG. 16(a) is an explanation view showing another attachment structure of the original document pressing plate and the pressing-contacting sheet member.
Figure 16B:
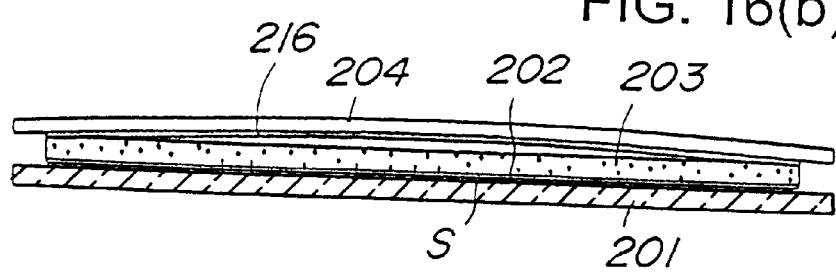
FIG. 16(b) is a cross-sectional view showing the original document holding section of the original document reading apparatus.

On the back surface of the original document pressing plate 204, a reinforcing rib is usually placed. In this case, the rib surface also follows the warping shape of the original document pressing plate 204, so, as shown in FIGS. 16(a) and 16(b), the elastic member 203 may be placed in the lowest surface of the surface of a rib 216.

It is to be noted that the placing point of the elastic member 203 is desirably positioned on the same level as that of the contact glass surface serving as a standard when the original document pressing plate 204 is closed, but when a small difference in level (errors) occurs, there is no problem because such difference is absorbed by stretching and contraction of the elastic member 203. In addition, the elastic member 203 is desirably structured to have the same height (thickness), but if there is a difference in height, no problem occurs as long as the amount is small.

Figure 17A:
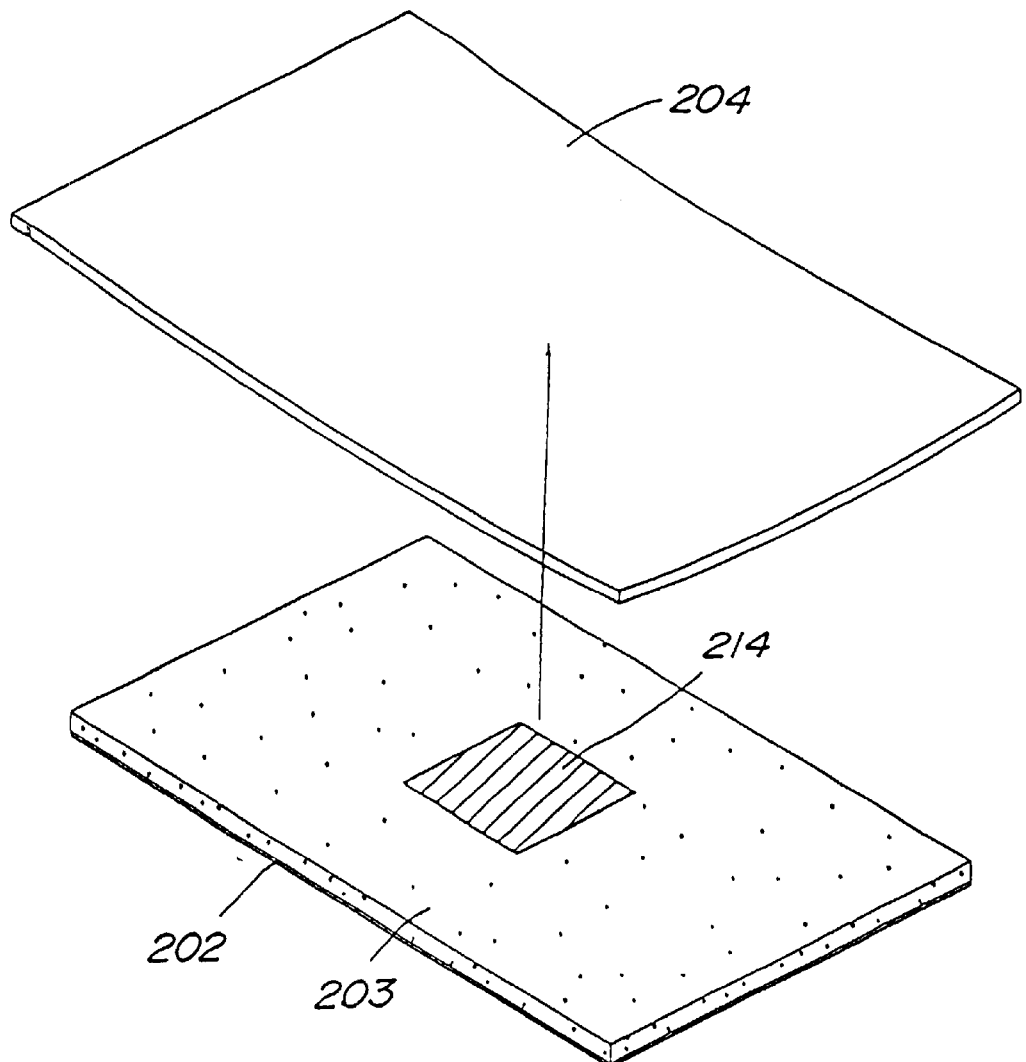
FIG. 17(a) is an explanation view showing another attachment structure of the original document pressing plate and the pressing-contacting sheet member.
Figure 17B:
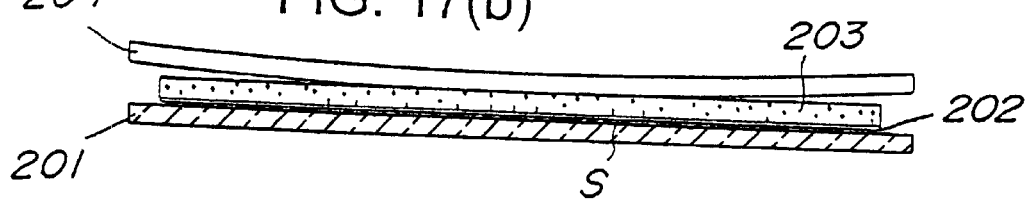
FIG. 17(b) is a cross-sectional view showing the original document holding section of the original document reading apparatus.

FIG. 17 is an explanation view showing a case when the original document pressing plate has a downward warp on the center portion with respect to the end portions, and in this case, the attachment portion 214 for attaching the elastic member 203 to the original document pressing plate 204 is placed in one center portion in the vicinity of the lowest surface of the warping shape of the original document pressing plate 204. In this case, as shown in FIG. 17(b), the pressing-contacting sheet member 202 can also make the original document S closely in contact with the contact glass 201 by its own flatness, rigidity, and flexibility, without following the warp of the original document pressing plate 204.

Fifth Embodiment

Figure 18A:
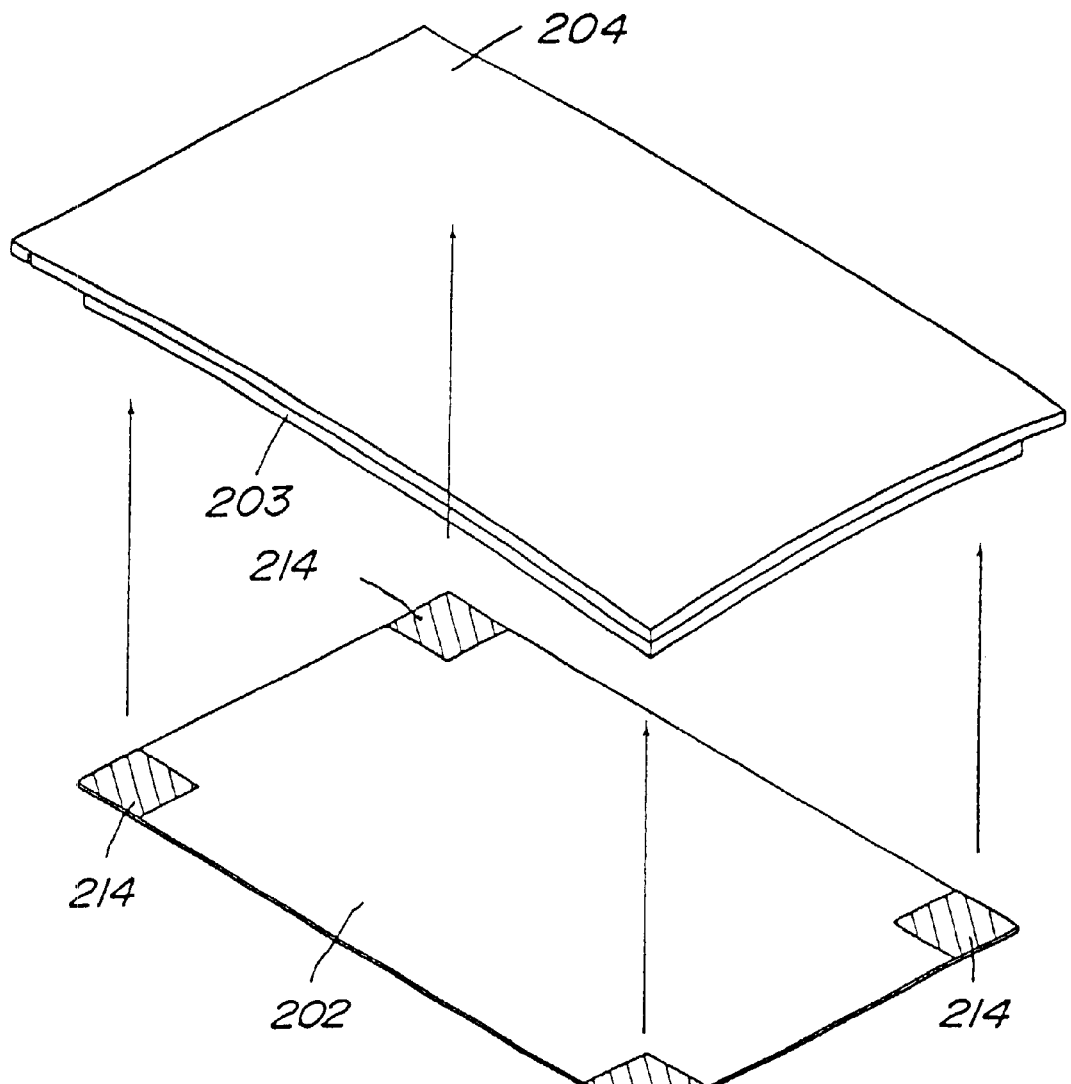
FIG. 18(a) is an explanation view showing a method of closely contacting an elastic sheet with an original document pressing plate to be attached thereafter to a pressing-contacting sheet member in an image reading apparatus according to a fifth embodiment of the present invention.
Figure 18B:
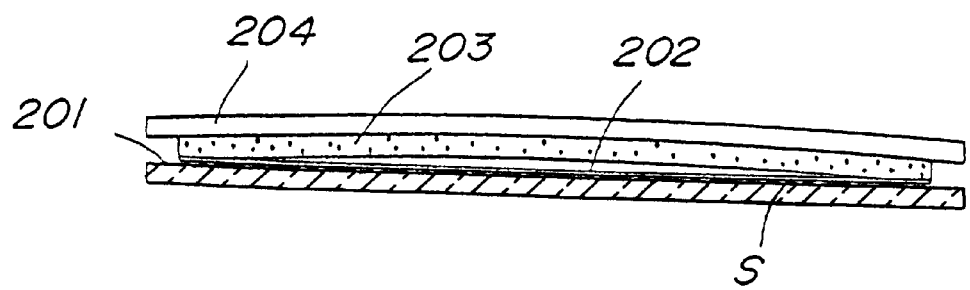
FIG. 18(b) is a cross-sectional view showing an original document holding section of the original document reading apparatus.

FIG. 18 is an explanation view showing a sheet holding apparatus according to a fifth embodiment. The difference between the sheet holding apparatus according to the fifth embodiment and the aforementioned forth embodiment is its attachment structure of the elastic member 203 and the pressing-contacting sheet member 202. That is, in the forth embodiment, the elastic member 203 is integrally formed with the pressing-contacting sheet member 202; in the fifth embodiment, on the other hand, the elastic member 203 made of a consecutive foamed body is entirely attached to the back surface of the original document pressing plate 204 having a shape where the center portion is warped upwardly with respect to the end portions, thus to be integrally formed therewith.

The pressing-contacting sheet member 202 is attached, with respect to the elastic member 203, by the attachment members 214 placed in the four corners in the vicinity of the lowest surface of the warping shape of the original document pressing plate 204. It is to be noted that materials or the like of the original document pressing plate 204, the elastic member 203, and the pressing-contacting sheet member 202 are the same as those used in the fifth embodiment as mentioned above.

Even with this structure, the pressing-contacting sheet member 202, without following the warp of the original document pressing plate 204, can make entirely the original document S closely in contact with the contact glass 201 by its own thickness, flatness, rigidity and flexibility as well as the weight of the original document pressing plate 204.

Figure 19A:
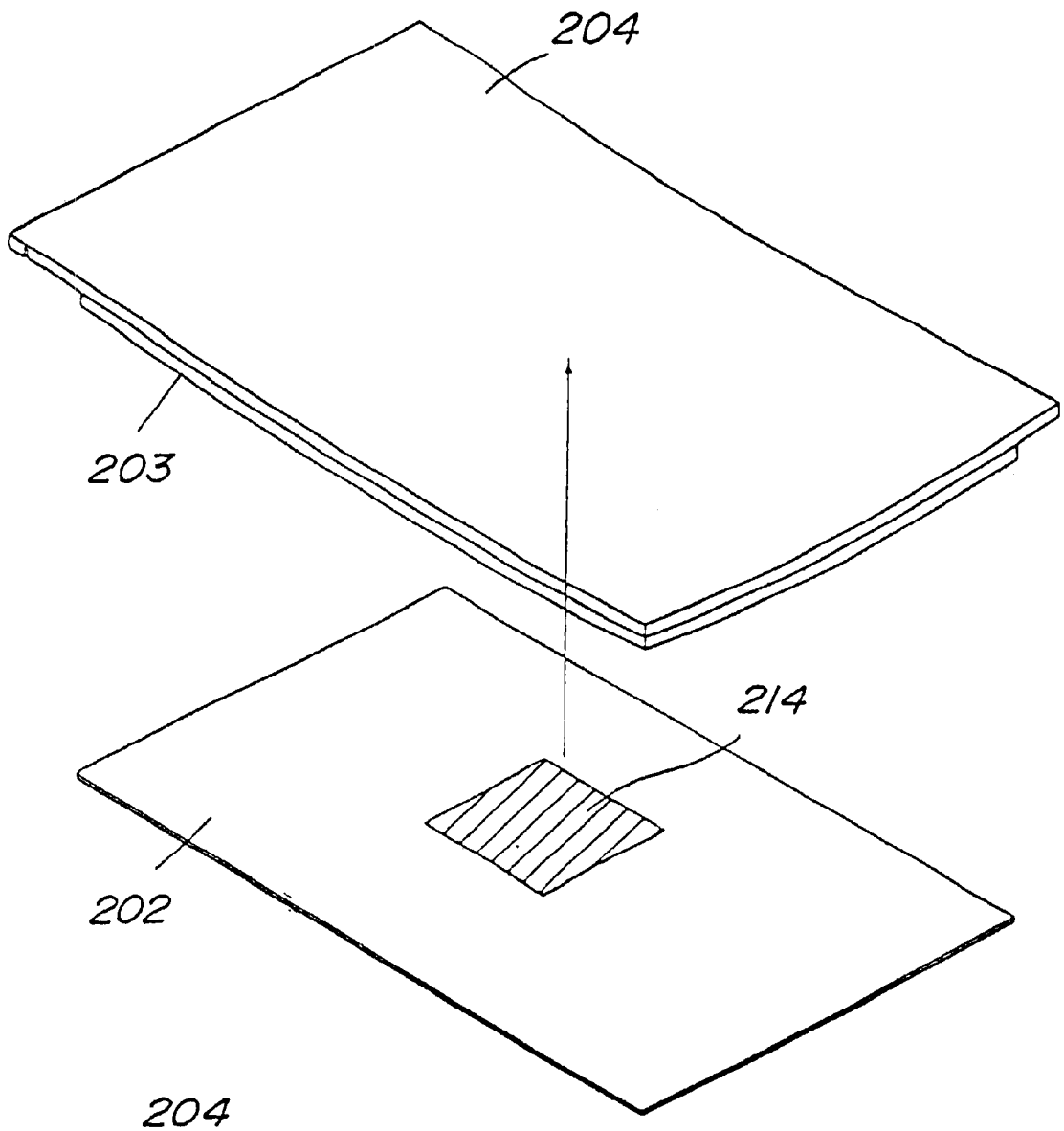
FIG. 19(a) is an explanation view showing another attachment structure of the original document pressing plate and the pressing-contacting sheet member.
Figure 19B:
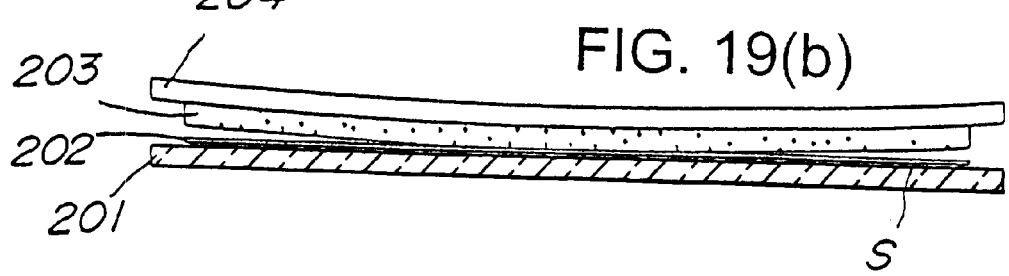
FIG. 19(b) is a cross-sectional view showing the original document holding section of the original document reading apparatus.

FIG. 19 is an explanation view showing a case when the original document pressing plate has a downward warp on the center portion with respect to the end portions, and in this case, the attachment portion 214 for attaching the pressing-contacting sheet member 202 to the elastic member 203 is placed in one center portion in the vicinity of the lowest surface of the warping shape of the original document pressing plate 204. In this case, as shown in FIG. 19(b), the pressing-contacting sheet member 202 can also make the original document S closely in contact with the contact glass 201 by its own flatness, rigidity, and flexibility, without following the warp of the original document pressing plate 204.

With the present invention thus structured as mentioned above, the original document is pressed on the surface of the contact glass by the pressing-contacting sheet member having a predetermined thickness, flatness and rigidity, and therefore the original document, even having a curl, can be closely contacted with the contact glass.

By placing the attachment portion between the elastic member and the original document pressing plate or the attachment portion between the pressing-contacting sheet and the elastic member, only in the vicinity of the lowest surface of the warping shape of the original document pressing plate, the pressing-contacting sheet member does not follow the warp, if the original document pressing plate is warped, thereby certainly making the original document closely in contact with the contact glass. In addition, since the pressing-contacting sheet member is not affected from an amount of warp of the original document pressing plate, quantitative management of the warping amount is not required.

Sixth Embodiment

Figure 20A:
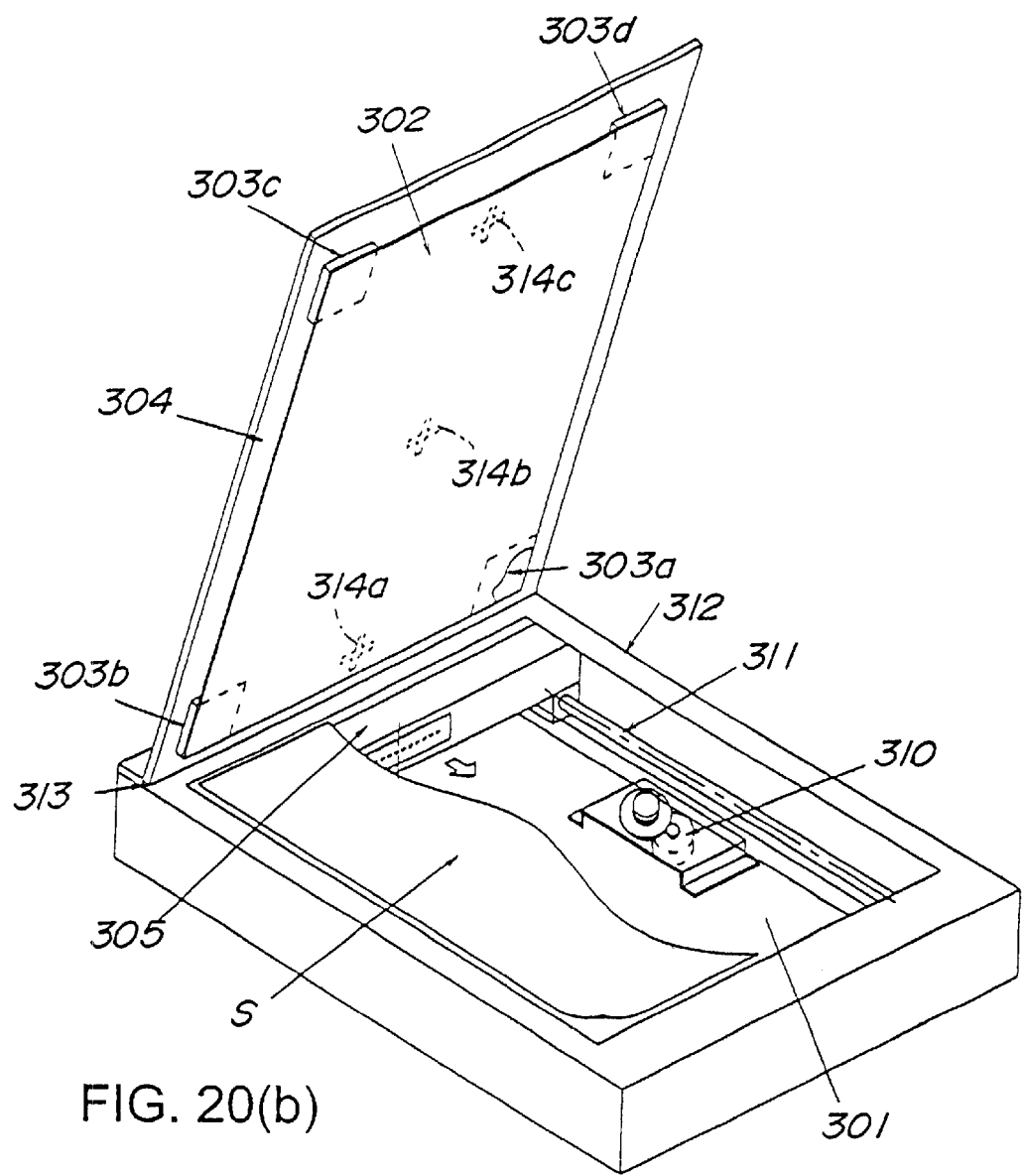
FIG. 20(a) is a perspective view showing an image reading apparatus according to a sixth embodiment of the present.
Figure 20B:
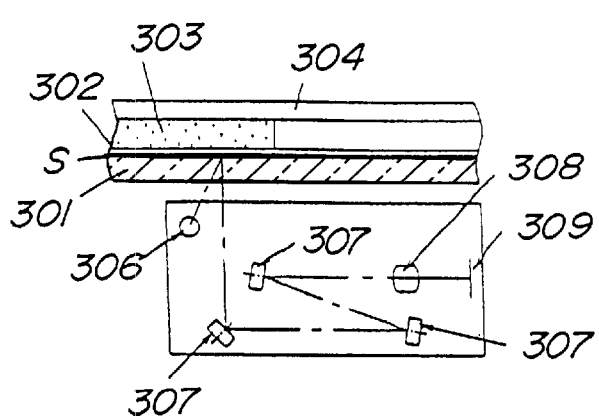
FIG. 20(b) is a cross-sectional view showing an original document holding section of the image reading apparatus.
Figure 21A:
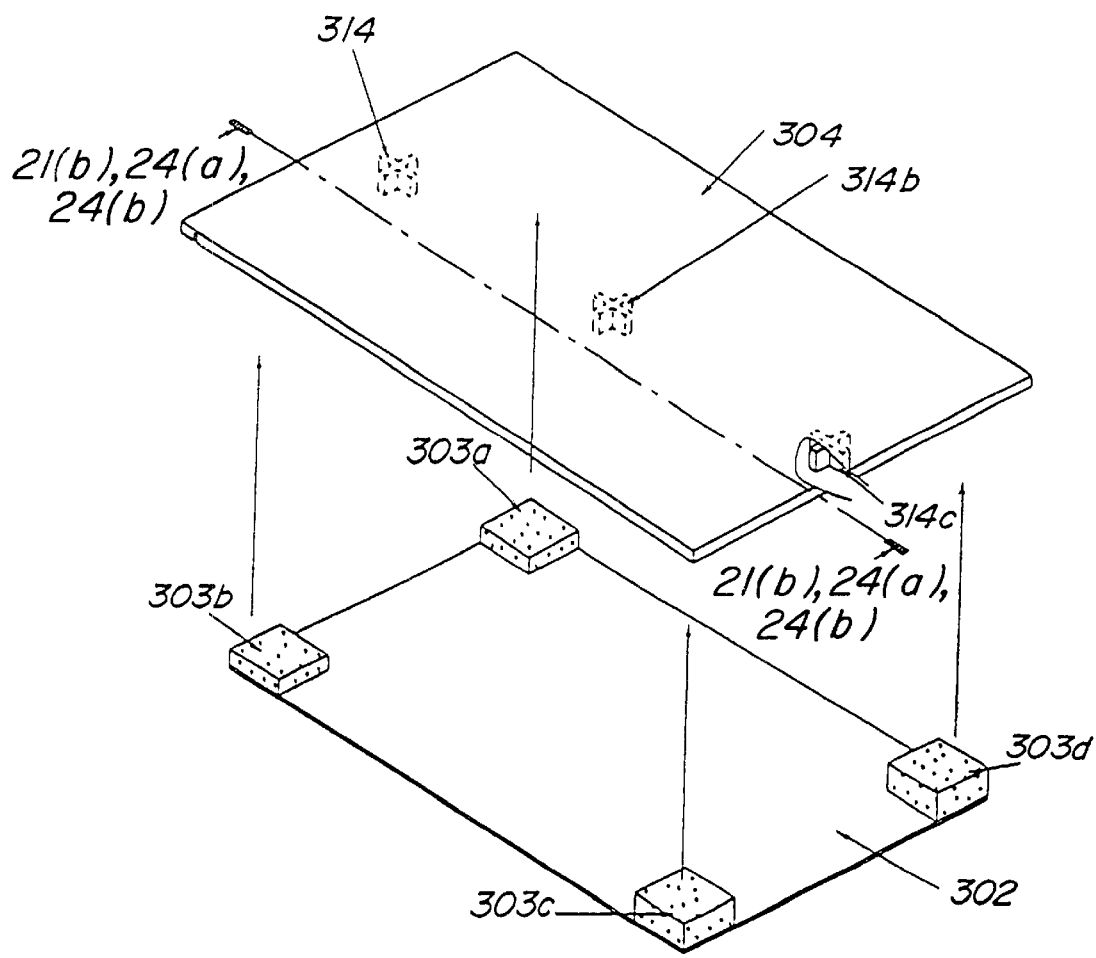
FIG. 21(a) is an explanation view showing a method of supporting a pressingcontacting sheet member by forming rib members on the center portion of an original document pressing plate of the original document reading apparatus.
Figure 21B:
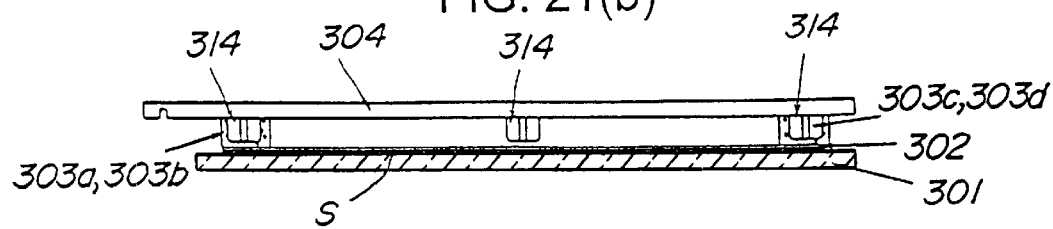
FIG. 21(b) is a cross-sectional view showing the original document holding section of the original document reading apparatus.
Figure 22:
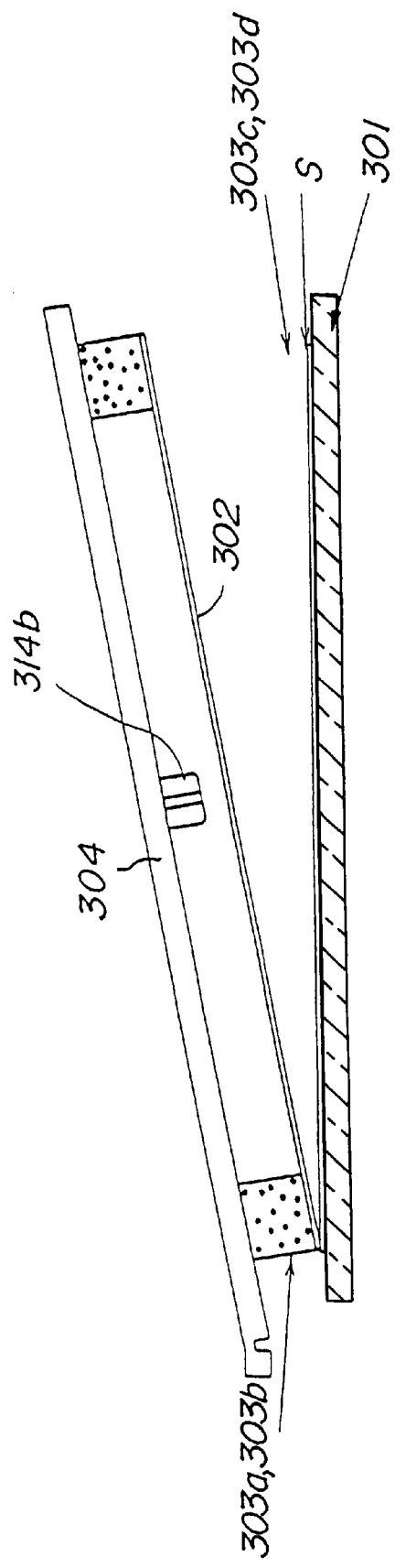
FIG. 22 is an explanation view showing operation of the rib members of the original document pressing plate.
Figure 24A:
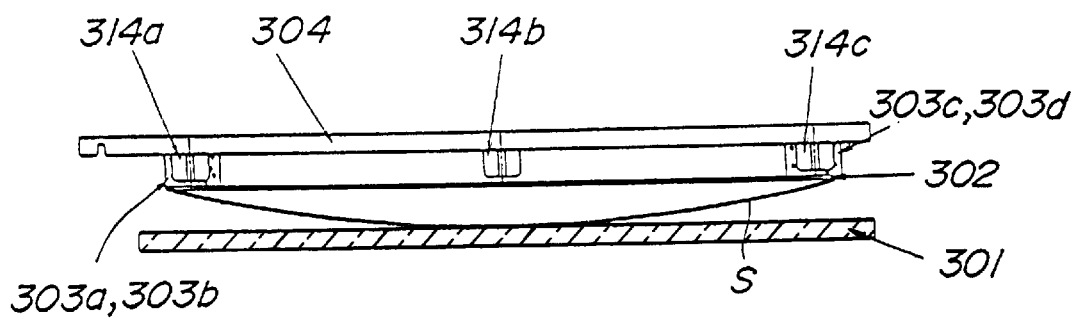
FIG. 24(a) is an explanation view showing operation of the rib members of the original document pressing plate when an original document has a warp.
Figure 24B:
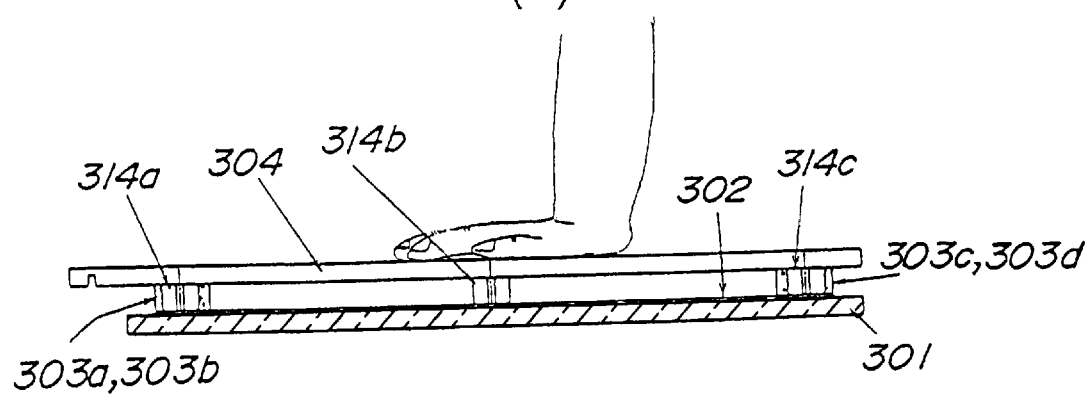
FIG. 24(b) is an explanation view showing operation of the rib members of the original document pressing plate when an original document has a warp.

Next, a sixth embodiment will be explained with reference to FIG. 20 to FIG. 24. Here, FIG. 20 is a perspective explanation view of a scanner as an image reading apparatus, and FIGS. 21(a) and 21(b) shows an original document pressingly pushing apparatus where FIG. 21(a) is the exploded perspective view of the parts and FIG. 21(b) is the cross-sectional explanation view. In addition, FIG. 22 is an explanation view showing a state when the original document pressing plate is closing, and FIG. 23 is an explanation view in the case that the pressing-contacting sheet member has a warp, and FIGS. 24(a) and 24(b) shows a case when the original document has a warp where FIG. 24(a) is the cross-sectional view and FIG. 24(b) is the explanation view showing a state when the original document pressing plate is being pressed.

First, a whole structure of the image reading apparatus having the original document holding-pressing apparatus will be schematically explained. As shown in FIG. 20(a), an original document S mounted on a surface of a contact glass 301 is pressingly contacted with the contact glass surface by an original document pressing plate 304 through a pressing-contacting sheet member 302 and elastic members 303 (303a, 303b, 303c, 303d) made of an integrally-foamed body.

Information described in the original document S thus pressingly contacted with the contact glass surface is then read by a reading means 305. Specifically, as shown in FIG. 20(b), the original document S is linearly irradiated by a light source 306 such as a lamp, LED or the like, and then light reflected by the original document travels through mirrors 307 and a lens or lenses 308 to form an image on a photoelectric conversion element 309. The aforementioned light source 306, the mirror 307, the lens 308, and the photoelectric conversion element 309 are structured as a unit so as to move (scan), driven by a motor 310, relatively to the original document S, along a guide 311 in a direction perpendicular to a longitudinal direction of the photoelectric conversion element 309, thus to read optically the plane-form original document image.

It is to be noted that, as the lens 308 mentioned above, a rod lens array using a contact type image sensor may be used.

Next, an original document holding structure by the original document pressing plate 304 will be specifically described. The original document pressing plate 304 is attached to a main body of the apparatus 312 on a rotary support 313 so as to be rotatable between a closing position for pressingly pushing the original document S mounted on the contact glass surface and an opening position for releasing the pressingly pushing operation. In the present embodiment, the original document pressing plate 304 is molded of ABS resin, and a sponge member such as moltprene or the like is used for the elastic member 303.

Used for the pressing-contacting sheet member 302 is a resin sheet such as PET, vinyl chloride, ABS, polycarbonate or the like having a thickness from 0.5 mm to 2 mm, a flatness of 1 mm or less across the whole area, a flexural rigidity of 200 kgf·mm² or higher, and a flexibility following the flat surface of the contact glass 301. In addition, it is preferable to use, as this pressing-contacting sheet member 302, a resin sheet having a reflectance of 87% or higher and a whiteness degree of 70% or higher.

As shown in FIG. 21, the elastic members 303 are placed in the plural spots between the pressing-contacting sheet member 302 and the original document pressing plate 304 (FIG. 21 shows an example of the four spots), to be pasted with the doublesided tapes or the like to the pressing-contacting sheet member 302 and the back surface of the original document pressing plate 304. In addition, among the plural elastic members 303, the elastic members 303a, 303b pasted to the position near the support 313 as a rotary center of the original document pressing plate 304 are set to have a thickness thinner than that of the elastic members 303c, 303d pasted to the position far from the support 313 so that the pressingly pushing force of the pressing-contacting sheet member 302 to push the original document S is set low. It is to be noted that not only the change in the thickness as mentioned above but also the change in size, density, material or the like between the elastic members 303a, 303b near the support 313 and the elastic members 303c, 303d far from the support 313 can be taken in order to make a difference in terms of the pressingly pushing force of the elastic members 303.

In addition, rib members 314 (314a, 314b, 314c) are integrally formed with the back surface of the original document pressing plate 304 in the plural spots. In this embodiment, as shown in FIG. 21(b), the rib member 314a is provided between the elastic member 303a and 303b; the rib member 314b is provided approximately in the center; and the rib members 314c is provided between the elastic member 303c and 303d in a state the original'document pressing plate 304 is closed. The height of the rib members 314 is so structured that, when the original document pressing plate is normally closed (without being held or pressed from the upper direction), the tip is separated from the pressing-contacting sheet member 302 in a range from 0.1 mm to 1 mm.

With the above structure, when the original document S is mounted on the contact glass 301 and the original document pressing plate 304 is closed, the pressingcontacting sheet member 302 follows the contact glass surface by the pressingly pushing force of the elastic members 303 as well as the thickness, flatness, rigidity and flexibility of the pressing-contacting sheet member 302 by itself, and then the pressingcontacting sheet member 302 is contacted closely with the contact glass through the entire surface.

Here, the pressing-contacting sheet member 302 desirably has a thickness of 0.5 mm to 2 mm, a flatness of 1 mm or less across the whole area, and a flexural rigidity of 200 kg·mm² or higher in order to follow the contact glass surface although it depends on the kinds of the materials of the pressing-contacting sheet member 302. When the thickness is less than 0.5 mm, if the original document has a warp or curl, the pressing-contacting sheet member 302, incapable of resisting the elasticity of the original document, cannot fully push the original document. When the thickness is more than 2 mm, the rigidity of the pressing-contacting sheet member by itself becomes strong, thereby incapable of following the contact glass 301. In addition, when the flatness is greater than 1 mm, the pressing-contacting sheet member 302, even if having flexibility, cannot fully follow the contact glass surface, thus generating a space between the pressing-contacting sheet member and the contact glass. Furthermore, the flexural rigidity is smaller than 200 kgf·mm², the pressing-contacting sheet member 302 is too soft to be closely contacted with the contact glass 301 because ruffles or the like are formed in the pressing-contacting sheet member in itself.

When the original document pressing plate 304 is closed as shown in FIG. 22, the portion near the support 313 first reaches the contact glass 301, but, because the Force of the elastic members 303a, 303b placed nearer the support 313 for pressingly pushing the pressing-contacting sheet member 302 is set lower than that of the elastic members 303c, 303d placed farther from the support 313, the elastic members nearer the support 313 are flexible to be escaped, thereby causing less resistance when the original document pressing plate 304 is closed. Also, the strong pressingly pushing force of the elastic members 303c, 303d located far from the support 313 can certainly hold the original document in the portion far from the support 313, thereby certainly preventing the original document from floating upwardly.

It is to be noted that, as shown in FIG. 23, the pressing-contacting sheet member 302 might be affected from its own warp or the curl of the original document, thus to be warped, but the pressing-contacting sheet member 302, when warped, hits the rib member 314b, so it is not warped more than the space between the aforementioned rib members 314 and the pressing-contacting sheet member 302. As a result, the space between the rib members 314 and the pressing-contacting sheet member 302 is set approximately in a range from 0.1 mm to 1 mm as mentioned above.

In the case of the thick original document having a strong curl as shown in FIG. 24(a), the original document pressing plate 304 might be floated upwardly, but in this case, a user pushes the original document pressing plate 304 from an upper direction by using his or her hand as shown in FIG. 24(b), thereby flattening the elastic member 303, and therefore the rib members 314 provided on the original document pressing plate 304 then push the pressing-contacting sheet member 302 onto the contact glass 301. Therefore, even the original document having a strong curl can be closely contacted with the contact glass surface certainly.

Figure 25A:
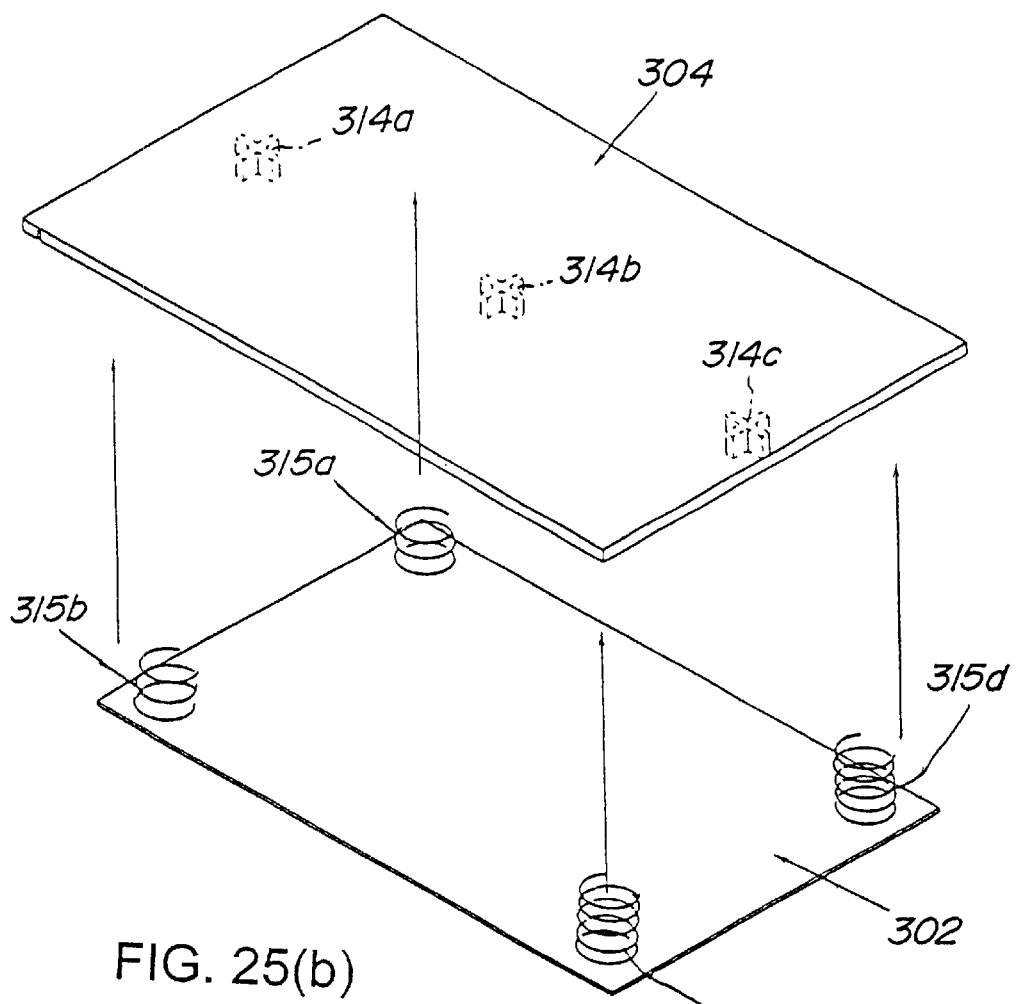
FIG. 25(a) is an explanation view showing another attachment structure of the original document pressing plate and the pressing-contacting sheet member.
Figure 25B:
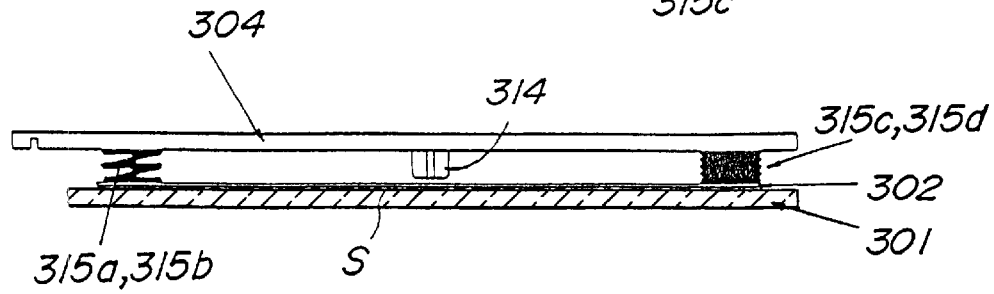
FIG. 25(b) is a cross-sectional view showing the original document holding section of the original document reading apparatus.

It is to be noted that, in this embodiment, moltprene is used as the elastic members 303, but not limited to this. That is, as shown in FIG. 25, coil springs 315 may be used as the elastic members so that the four corners of the pressing-contacting sheet member 302 are attached through the coil springs 315 (315a, 315b, 315c, 315d) to the original document pressing plate 304.

In this case, in the same way as that of the aforementioned embodiment, spring pressure of the coil spring 315a, 315b placed nearer the rotary support 313 of the original document pressing plate 304 is so set as to be smaller than that of the coil spring 315c, 315d placed farther from the rotary support 313. Even with this structure, when the original document pressing plate 304 is closed and the pressing-contacting sheet member 302 hits the original document S mounted on the contact glass 301, the coil springs 315 are flexible to be escaped, and as a result, the pressing-contacting sheet member 302 can make the entire original document closely in contact with the contact glass 301.

Figure 26A:
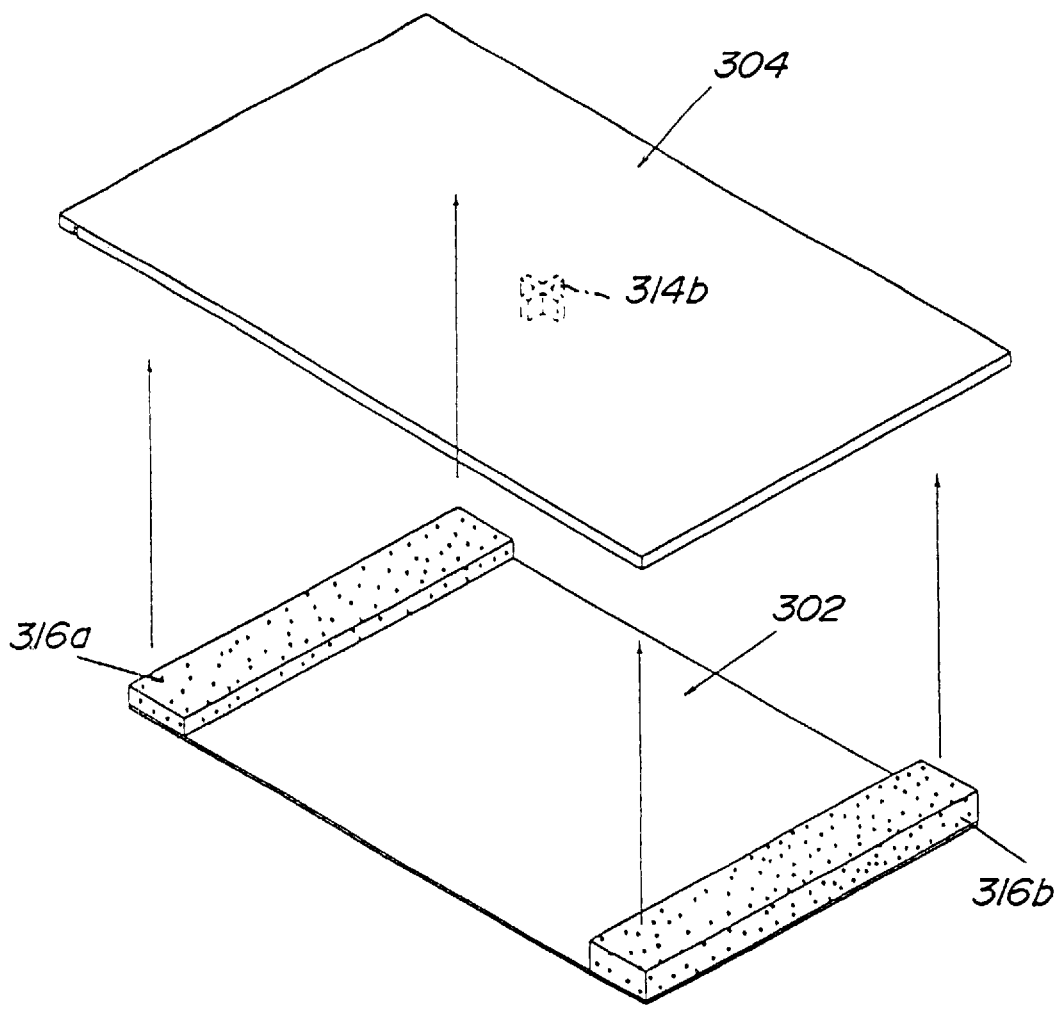
FIG. 26(a) is an explanation view showing another attachment method of the original document pressing plate and the pressing-contacting sheet member.
Figure 26B:
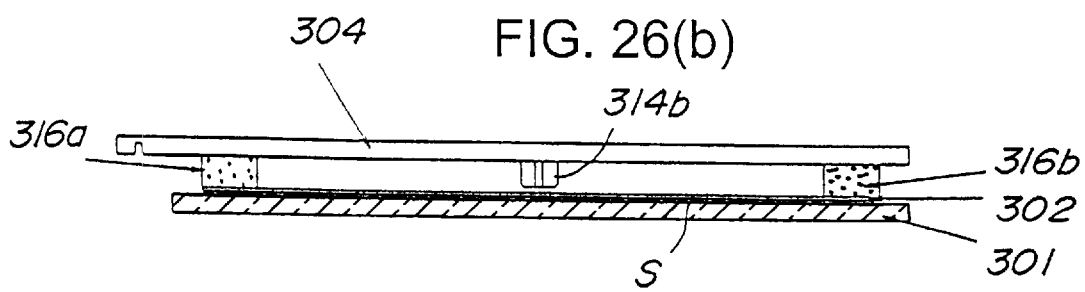
FIG. 26(b) is a cross-sectional view showing the original document holding section of the original document reading apparatus.

Although the aforementioned embodiment shows an example where the elastic members 303 are placed in the four corners of the pressing-contacting sheet member, the number of the elastic members is not necessarily limited to four. For example, as shown in FIG. 26, sponge pieces 316 (316a, 316b) respectively having the same length as that in a direction perpendicular to the longitudinal direction of the pressingcontacting sheet member 302 are used as the elastic members, and the pressingly pushing force of the sponge piece 316a placed near the rotary support 313 is set so as to be smaller than that of the sponge piece 316 placed farther from the rotary support 313. With this, the same effect can also be obtained.

Figure 27A:
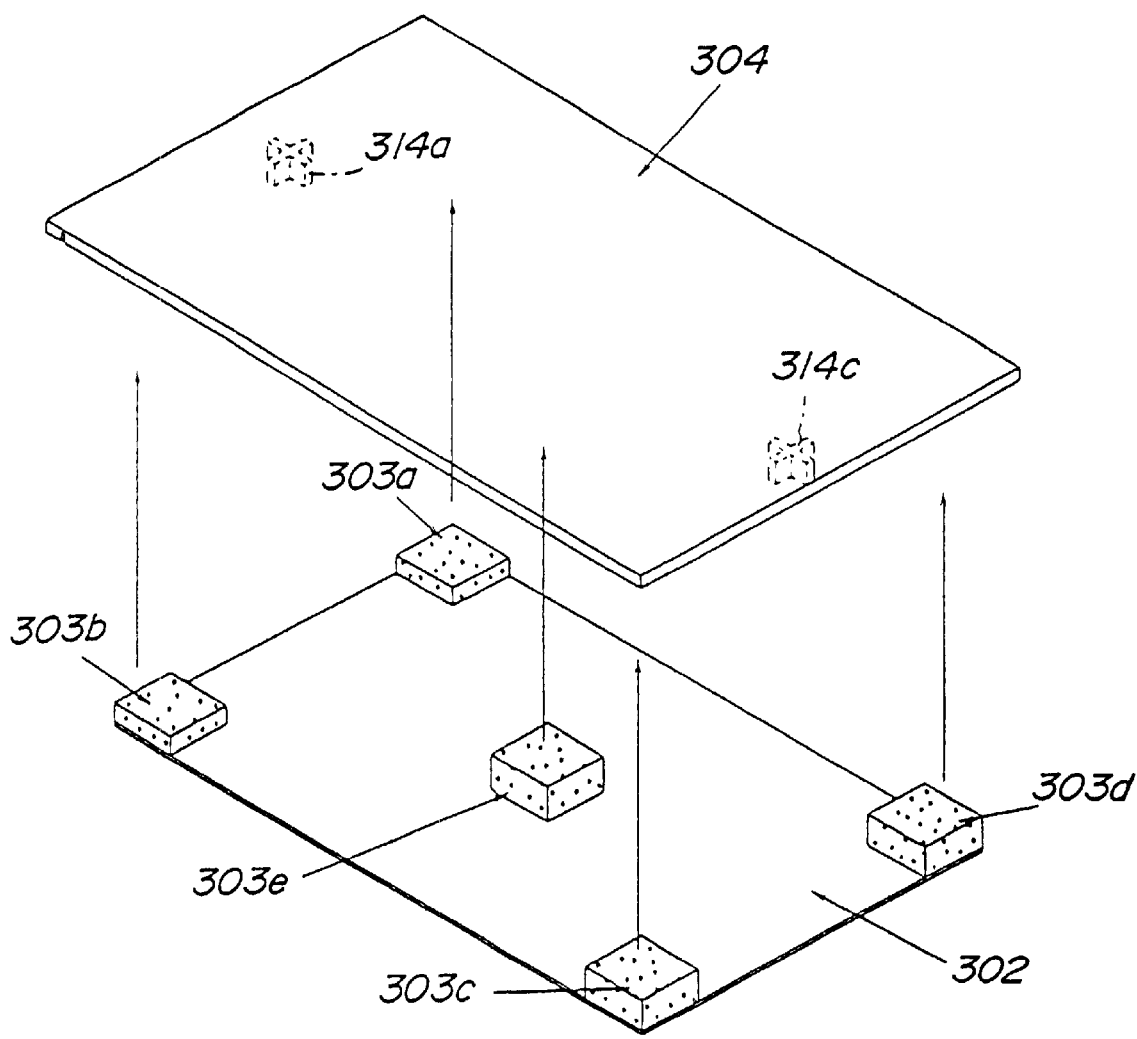
FIG. 27(a) is an explanation view showing another attachment structure of the original document pressing plate and the pressing-contacting sheet member.
Figure 27B:
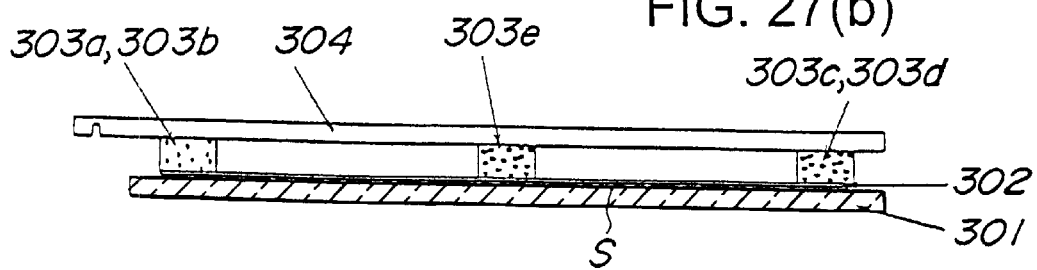
FIG. 27(b) is a cross-sectional view showing the original document holding section of the original document reading apparatus.

Furthermore, as shown in FIG. 27, another elastic member 303 may be placed in the center of the pressing-contacting sheet member 302 in addition to those in the four corners. In this case, it is just required to equalize the elasticity of the elastic member 303e in the center either with the elasticity of the elastic members 303a, 303b placed near the rotary support 313 or with the elasticity of the elastic members 303c, 303d placed far from rotary support 313, and it may be set in accordance with the material of the pressing-contacting sheet member 302.

Figure 28A:
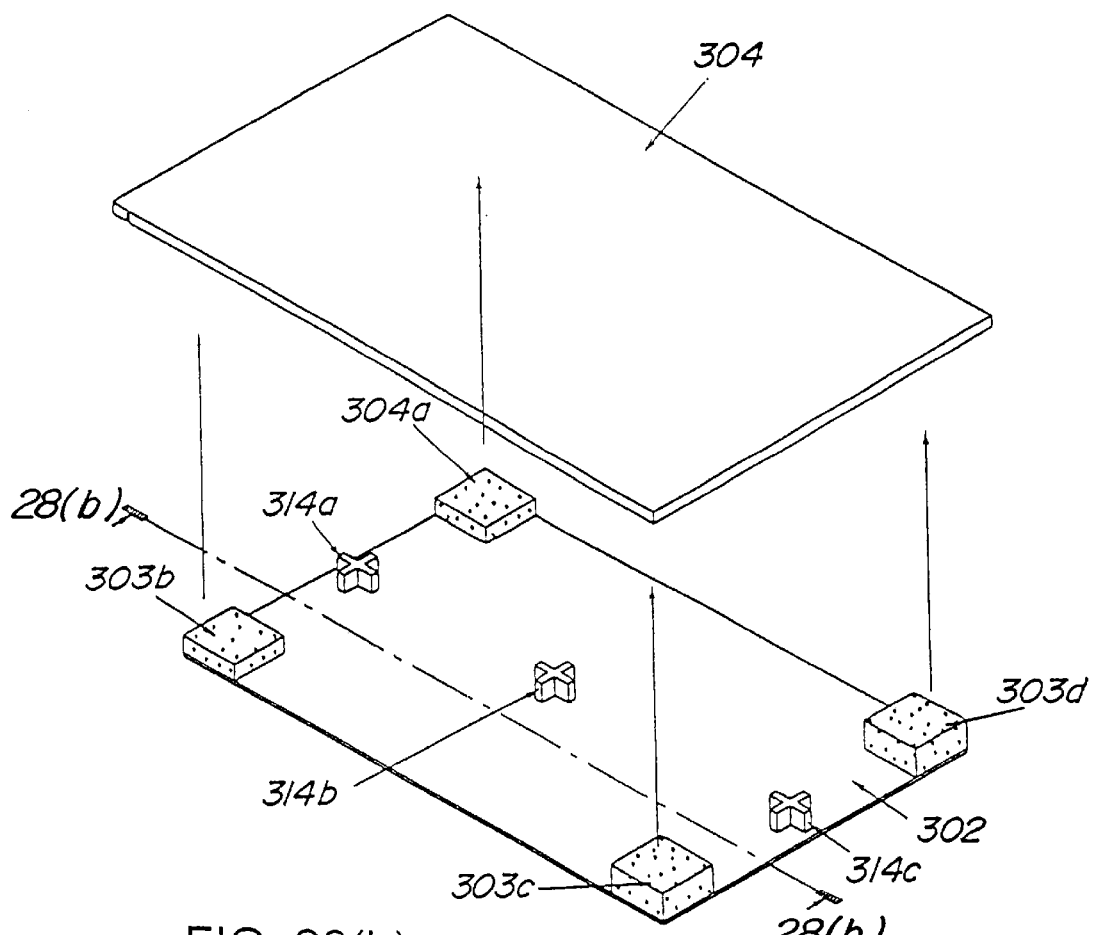
FIG. 28(a) is an explanation view showing another attachment structure of the original document pressing plate and the pressing-contacting sheet member.
Figure 28B:
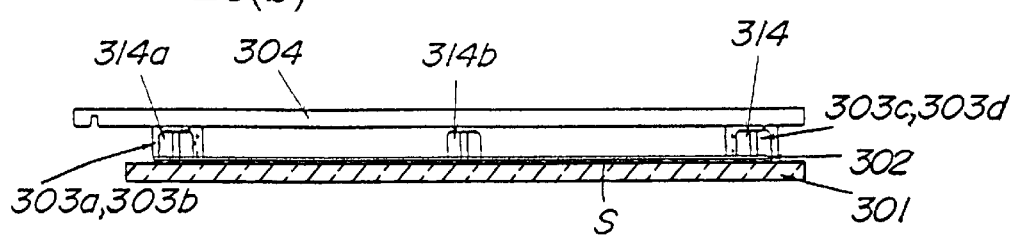
FIG. 28(b) is a cross-sectional view showing the original document holding section of the original document reading apparatus.

Moreover, although the aforementioned embodiment shows an example where the rib members 314 are integrally formed with the original document pressing plate 304, the rib members 314 may be integrally formed with the pressing-contacting sheet member 302 as shown in FIG. 28. In this case, the space between the rib members 314 (314a, 314b, 314c) and the original document pressing plate 304 is structured so as to be in a range from 0.1 mm to 1 mm under a state where no load is applied to the original document pressing plate 304. Here, when the pressing-contacting sheet member 302 is warped, the tip of the rib members 314 hit the original document pressing plate 304. With this arrangement, the same effect as that in the aforementioned embodiment can also be obtained.

With the present invention thus structured as mentioned above, the rigidity, flatness or the like of the pressing-contacting sheet member can make the original document closely in contact with the contact glass, and therefore, it is not required to form the elastic member on the entire surface of the pressing-contacting sheet member as well as the weight of the original document pressing plate by itself can be reduced, thereby making the apparatus lighter and smaller.

In the case that the original document pressing plate is structured so as to be rotatable with respect to the main body of the apparatus, floating movement of the original document at a portion apart from the rotary center is preventable and the entire surface of the original document can be closely in contact with the contact glass certainly, by setting the original document pressingly pushing force of the elastic member, in a position near the rotary center, when the original document pressing plate is rotated to be in its closing position, lower than that in a position far from the rotary center.

Seventh Embodiment

Figure 29A:
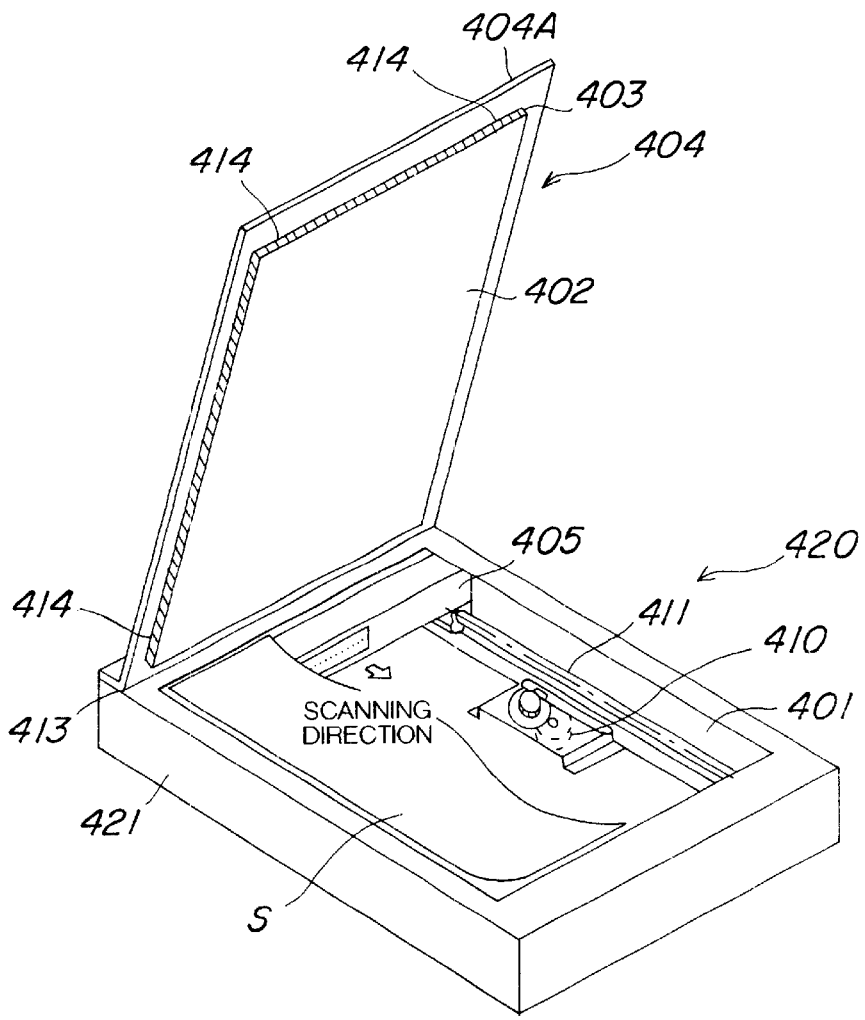
FIG. 29(a) is a perspective view showing an image reading apparatus according to a seventh embodiment of the present invention.

FIG. 29(a) is a perspective view of a scanner as one embodiment of the image reading apparatus according to a seventh embodiment of the present invention. In FIG. 29(a), numeral 420 refers to a scanner; numeral 421 refers to a main body of the scanner as a main body of the apparatus; numeral 401 refers to a contact glass arranged on the upper surface of the main body 421 of the scanner. Numeral 405 is a reading means arranged below the contact glass 401, including a light source 406 such as a lamp, LED or the like, mirror 407, a lens or lenses 408, and a photoelectric conversion element 409 as shown in FIG. 29(b), and this reading means 405 is structured to move in a scanning direction indicated by an arrow along a guide 411 by a motor 410 as shown in FIG. 29(a).

Figure 29B:
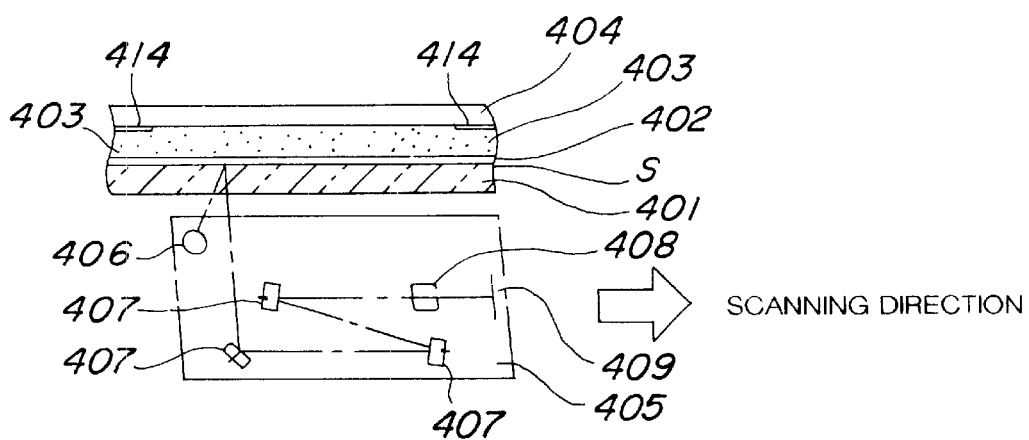
FIG. 29(b) is a cross-sectional view showing an original document holding section of the image reading apparatus.

In order to read images of an original document S mounted on the contact glass 401, it is so structured that, as shown in FIG. 29(b), light from the light source 406 linearly irradiates the original document S, and then light reflected by the original document travels through the mirrors 407 and the lens 408 to form an image on the photoelectric conversion element 409, and also the reading means 405 moves (scans), relatively to the original document S, in a direction perpendicular to a longitudinal direction of the photoelectric conversion element 409. It is to be noted that the reading means 405 may use a rod lens array using a contact type image sensor as the lens 408.

On the other hand, in FIG. 29(*a*), numeral 404 is an original document pressing plate, serving as an original document holding means, attached movably up and down to the main body 421 of the scanner through a rotary support 413, and this original document pressing plate 404 can make the original document S which is mounted on the surface of the contact glass 401 closely in contact with the contact glass surface.

The original document pressing plate 404 is provided with a pressing plate main body 404A for pressingly pushing the original document S mounted on the contact glass surface, a pressing-contacting sheet member 402 provided below the pressing plate main body 404A for pressingly contacting with the original document S mounted on the contact glass surface, and an elastic sheet material 403 provided between the pressing plate main body 404A and the pressing-contacting sheet member 402 for attaching the pressing plate main body 404A and the pressing-contacting sheet member 402 together. It is to be noted that, in this embodiment, the pressing plate main body 404A and the elastic sheet material 403 are molded of ABS resin and a consecutive foamed body respectively, and polypropylene is used for the pressing-contacting sheet member 402.

Figure 30A:
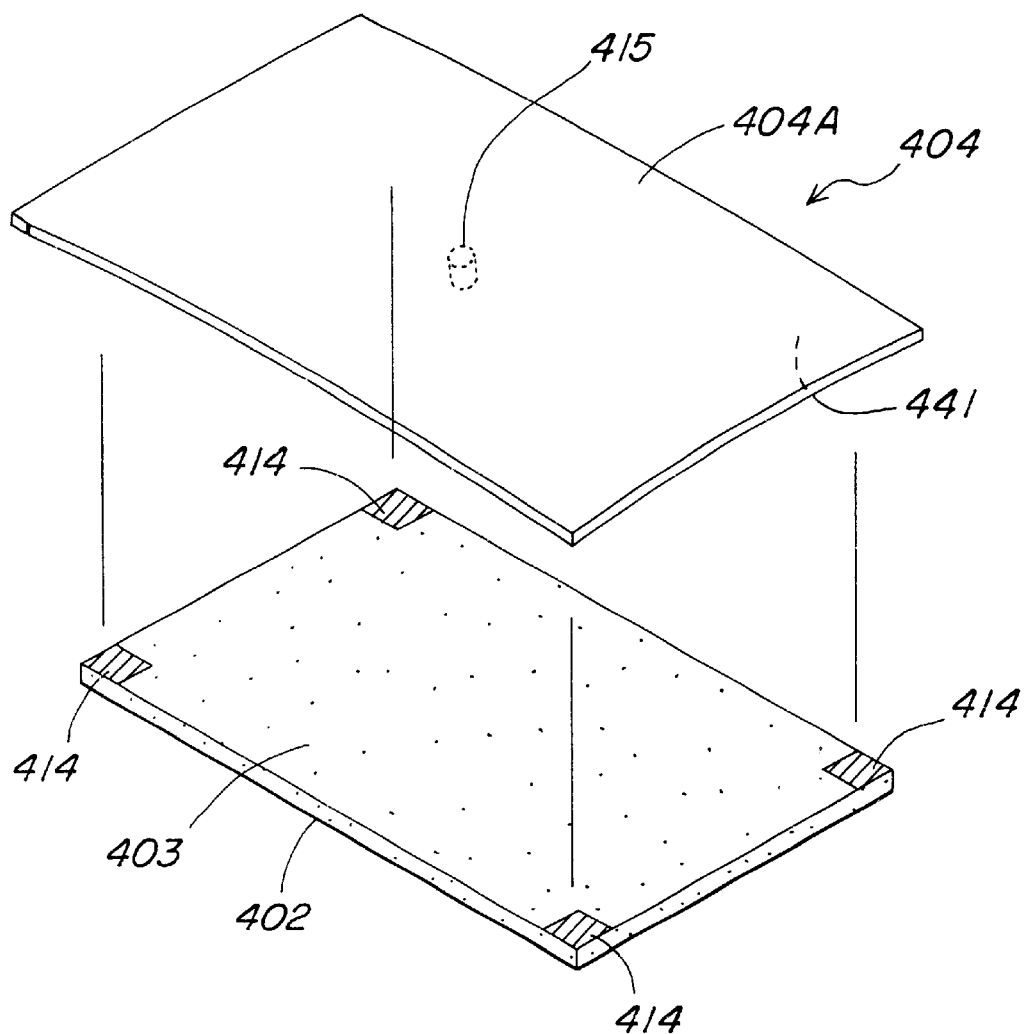
FIG. 30(a) is a method of forming a space between an original document pressing plate and a pressing-contacting sheet member and then supporting the pressingcontacting sheet member with an elastic protruding portion in the original document reading apparatus.
Figure 30B:
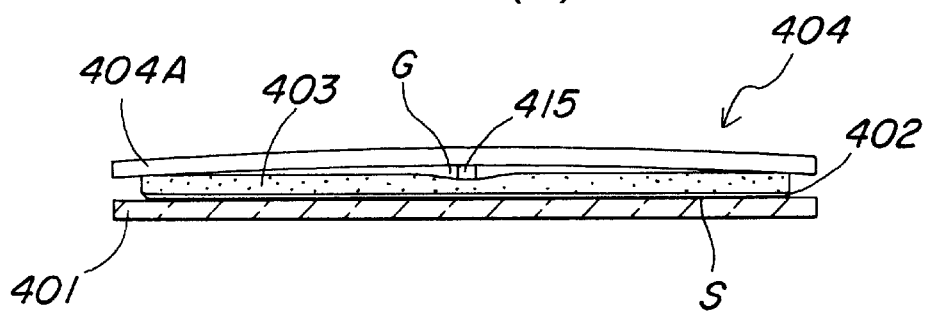
FIG. 30(b) is a cross-sectional view showing the original document holding section of the original document reading apparatus.

The pressing plate main body 404A has a shape with a center portion warped upwardly (curved), and in the center portion of the back surface, as a surface attached to the elastic sheet material, of the pressing plate main body 404A, there is a protruding portion 415 as shown in FIG. 30(*a*) formed integrally therewith so as to extend downwardly and out to be lower than the downwardly warped end portions of the pressing plate main body 404A. It is to be noted that the warping direction of the pressing plate main body 404A can be controlled according to molding conditions including a gate position or cooling method.

On the other hand, in FIG. 30 (*a*), numeral 414 shows attachment portions composed of double-sided tapes provided in four corners of the elastic sheet material 403, and with these attachment portions 414, the elastic sheet material 403 is attached to a downwardly warped peripheral portion of a bottom face 441 of the pressing plate main body 404A, that is, to four corners in this embodiment. It is to be noted that the pressing-contacting sheet member 402 is attached with double-sided tapes (not shown) to the original document side of the elastic sheet material 403.

By holding the elastic sheet material 403 and the pressing-contacting sheet member 402 in the four corners of the pressing plate main body 404A serving as an original document pressing plate as mentioned above, the pressing-contacting sheet member 402 (and elastic sheet material 403), even when the pressing plate main body 404A has a shape with the center upwardly warped, is not affected from interference of the pressing plate main body 404A, thus to be closely in contact with the contact glass 401 with its own weight, as shown in FIG. 30(*b*).

Also, in the case of holding the pressing-contacting sheet member 402 and the elastic sheet material 403 in the four corners of the pressing plate main body 404A as mentioned above, a space G is formed between the center portion of the pressing plate main body 404A and the elastic sheet material 403, and in this case, however, since the protruding portion 415 provided in the center portion of the pressing plate main body 404A is so structured as to extend downwardly and out to be lower than the downwardly warped end portions of the pressing plate main body 404A as mentioned above, this protruding portion 415 extends in the space G to pressingly push the center portion of the elastic sheet material 403.

By pressingly pushing the center portion of the elastic sheet material 403 with the protruding portion 415 as mentioned above, the center portion of the elastic sheet material 403 is then bent toward the original document direction, and consequently, when the original document pressing plate 404 is closed, reactive force for pushing the pressing-contacting sheet member 402 onto the contact glass 401 is generated in the elastic sheet material 403, and furthermore, with this reactive force, the pressingcontacting sheet member 402 is closely contacted, across its entire range, with the contact glass 401, without following the warp of the pressing plate main body 404A.

By attaching the elastic sheet material 403 and the pressing-contacting sheet member 402 to the peripheral portion of the pressing plate main body 404A while having the space G therebetween with the center portion of the pressing plate main body 404A, as well as, by pressingly pushing the elastic sheet material 403 to the direction of the original document by the protruding portion 415, it becomes possible that the elastic sheet material 403 and the pressing-contacting sheet member 402 do not follow the warp of the pressing plate main body 404A. Therefore, the original document S, even having a curl, can be fully pushed onto the contact glass 401, thereby making the original document S closely in contact with the contact glass 401.

It is to be noted that, when the original document pressing plate 404 is closed, the protruding portion 415 pressingly pushes the elastic sheet material 403, and even in this case, the elastic sheet material 403, when pressingly pushed by the protruding portion 415, then pressingly pushes the pressing-contacting sheet member 402, after absorbing, with its own elasticity, a considerable amount of the pressingly pushing force of the protruding portion 415. Due to this, when the pressing plate main body 404A is manufactured, the quantitative management of the warping amount is not required as long as controlling in the warping direction is carried out, with the result that manufacturing the pressing plate main body 404A becomes simpler.

Figure 31A:
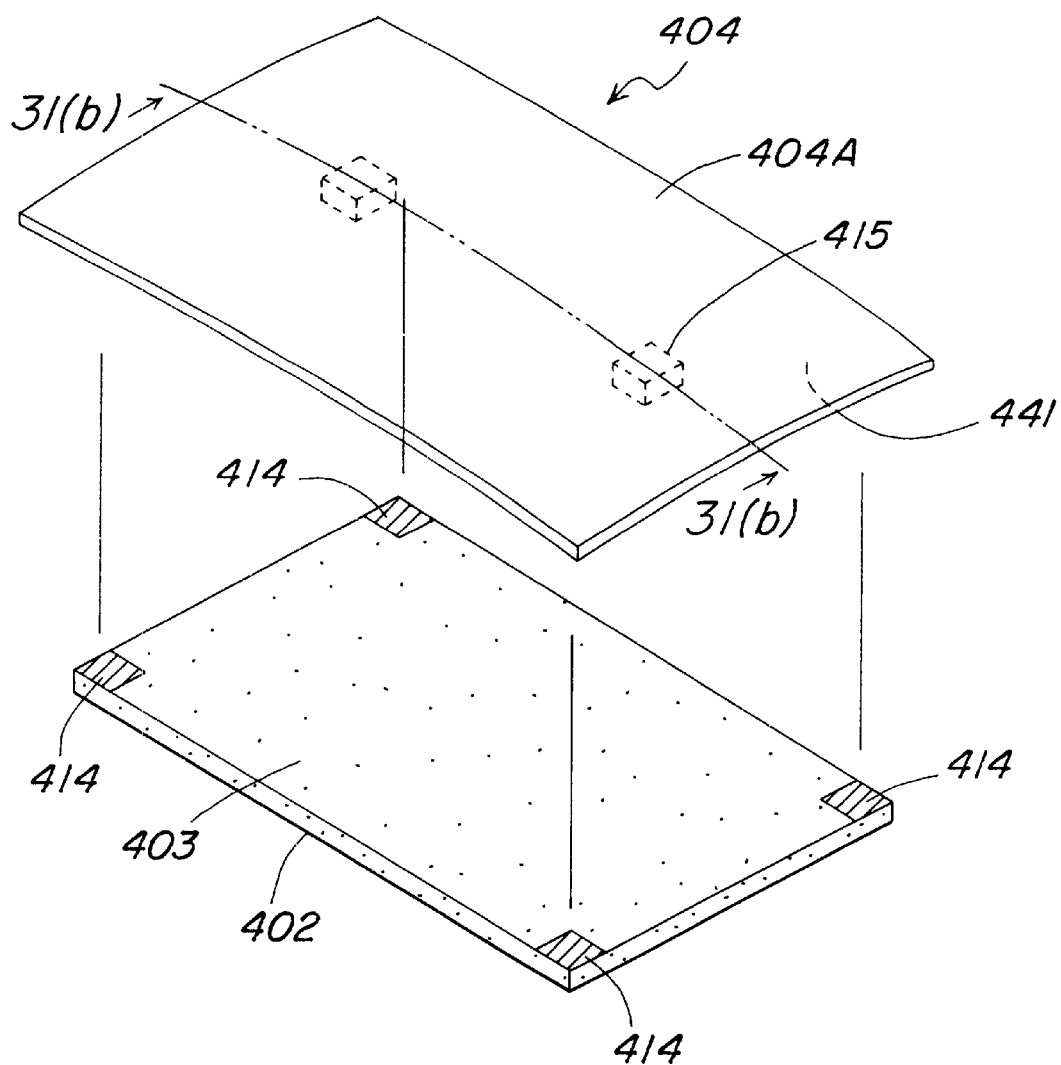
FIG. 31(a) is an explanation view showing another attachment structure of the original document pressing plate and the pressing-contacting sheet member.
Figure 31B:
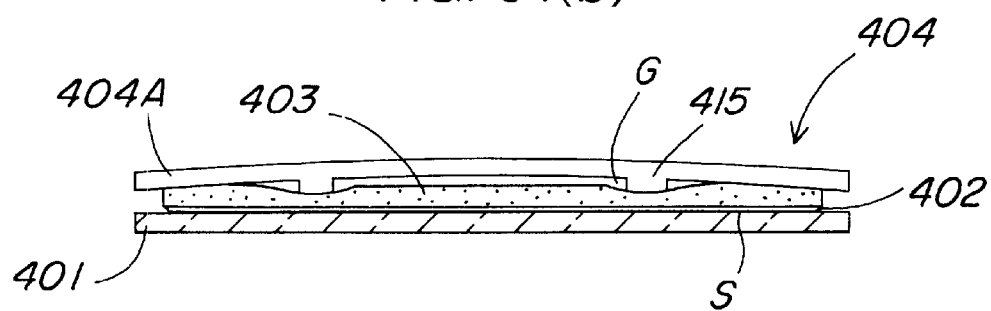
FIG. 31(b) is a cross-sectional view showing the original document holding section of the original document reading apparatus.

In the aforementioned embodiment, as shown in FIG. 30, one protruding portion 415 having a cylindrical shape, as integrally formed with the center portion of the pressing plate main body 404A, but the present invention is not limited to this; for example, as shown in FIG. 31(*a*) and FIG. 31(*b*), a plurality of the protruding portions may be arranged in the center portion of the pressing plate main body 404A, and also the shape is not limited to the cylindrical shape; a cubical shape or a triangular prism shape may be possible.

Figure 32A:
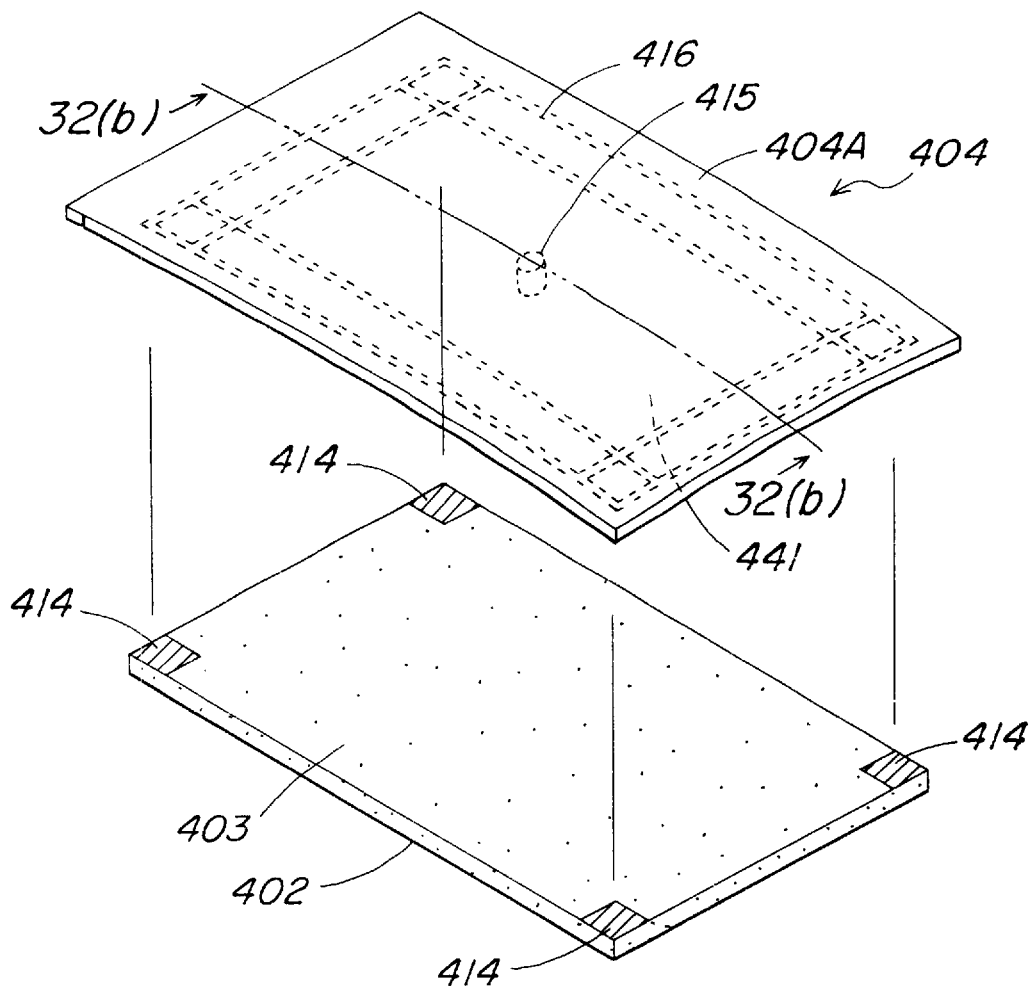
FIG. 32(a) is an explanation view showing another attachment structure of the original document pressing plate and the pressing-contacting sheet member.
Figure 32B:
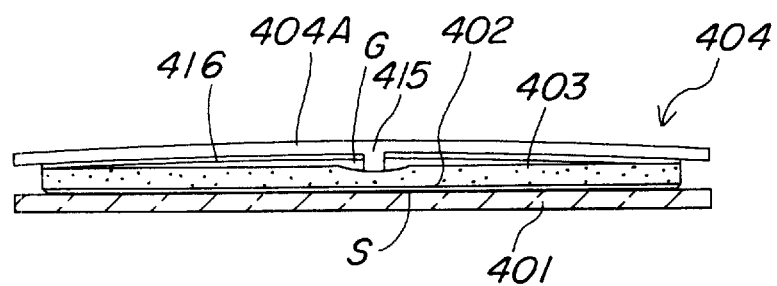
FIG. 32(b) is a cross-sectional view showing the original document holding section of the original document reading apparatus.

In addition, there is a case where a reinforcing rib 416 is provided on the back surface 441 of the pressing plate main body 404A, and in this case, since the rib surface of the reinforcing rib 416 also follows the warping shape of the pressing plate main body 404A, the protruding portion 415 is made to protrude downwardly over the lowest surface of the rib surface as shown in FIG. 32(*a*) and FIG. 32(*b*), in order to make the original document having a curl closely in contact with the contact glass 401.

Furthermore, the aforementioned description shows a case where the protruding portion 415 of the pressing plate main body 404A is integrally formed with the pressing plate main body 404A, but the present invention is not limited to this, and the protruding portion may be formed as a separated body from the pressing plate main body 404A.

Another structure example of the present embodiment will be explained with reference to FIG. 33.

Figure 33A:
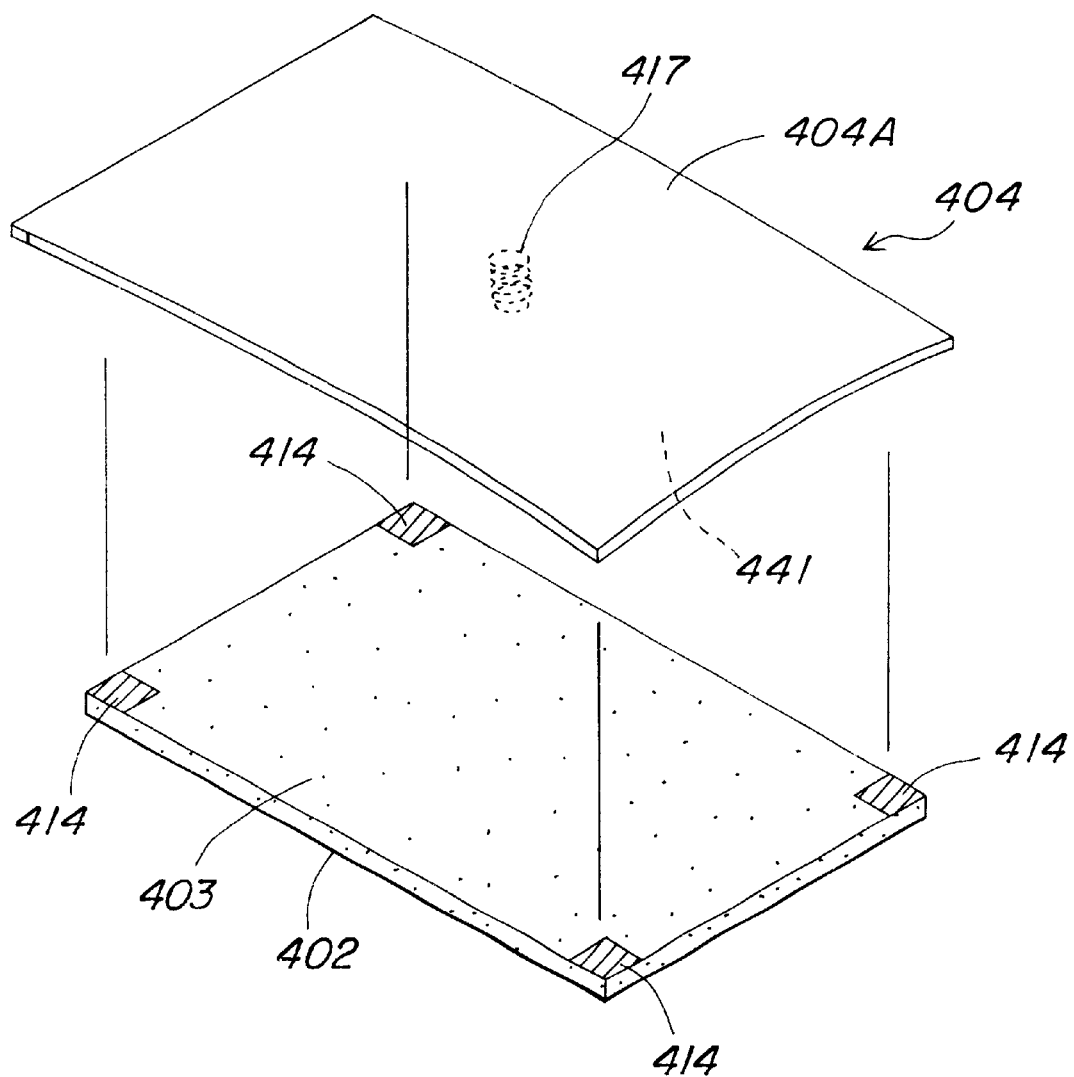
FIG. 33(a) is an explanation view showing another attachment structure of the original document pressing plate and the pressing-contacting sheet member.
Figure 33B:
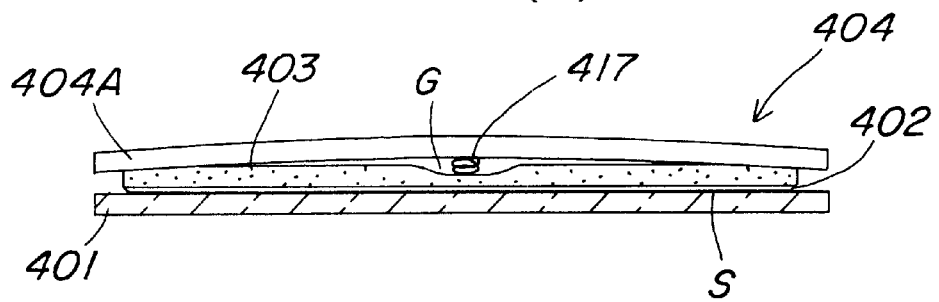
FIG. 33(b) is a cross-sectional view showing the original document holding section of the original document reading apparatus.
Figure 34A:
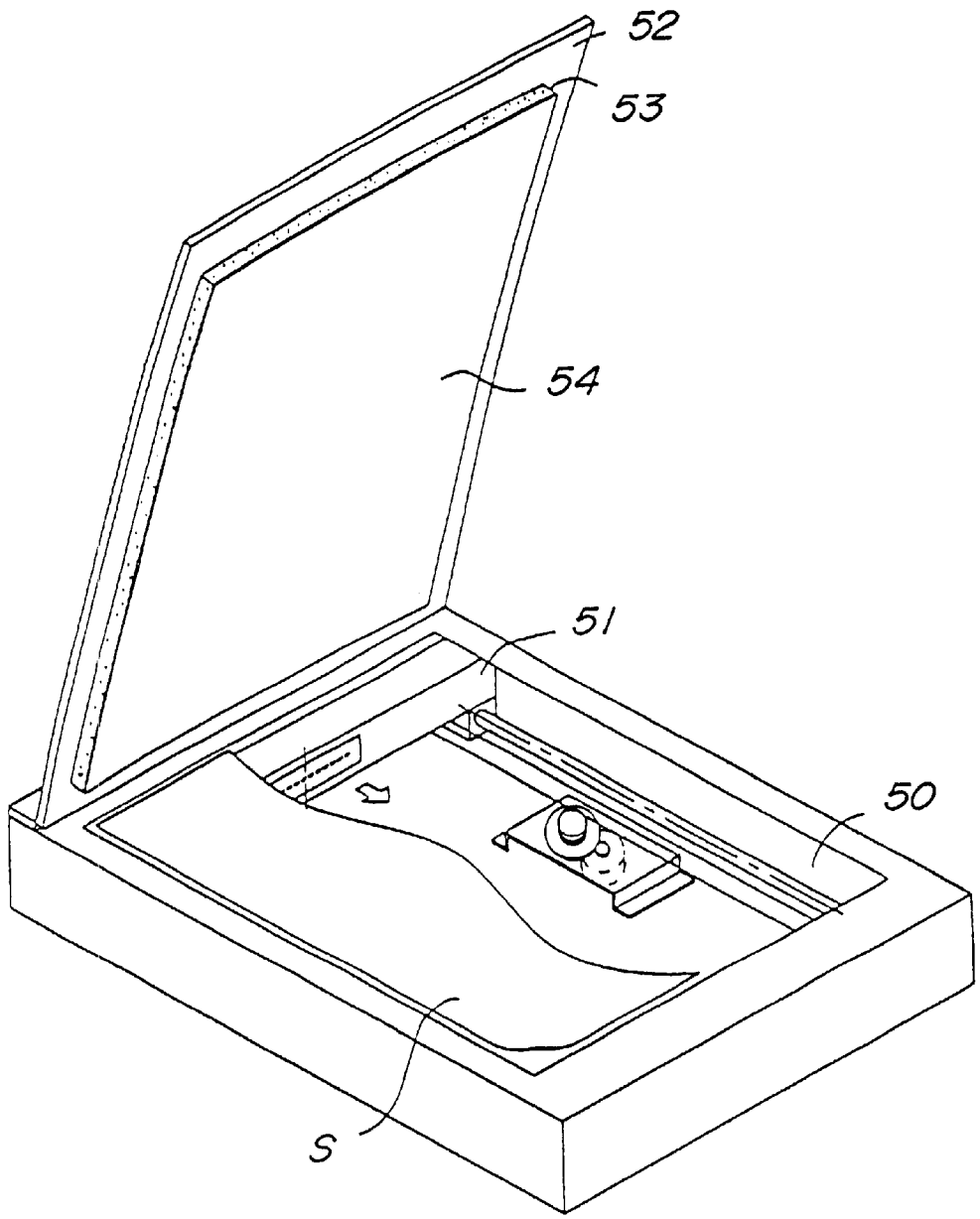
FIG. 34(a) is an explanation view showing a conventional attachment structure of an original document pressing plate and a pressing-contacting sheet member of an original document reading apparatus where the original document pressing plate is warped downwardly.
Figure 34B:
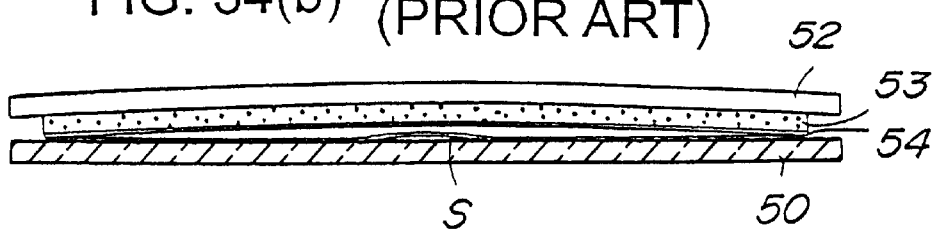
FIG. 34(b) is a cross-sectional view showing an original document holding section of the original document reading apparatus.
Figure 35A:
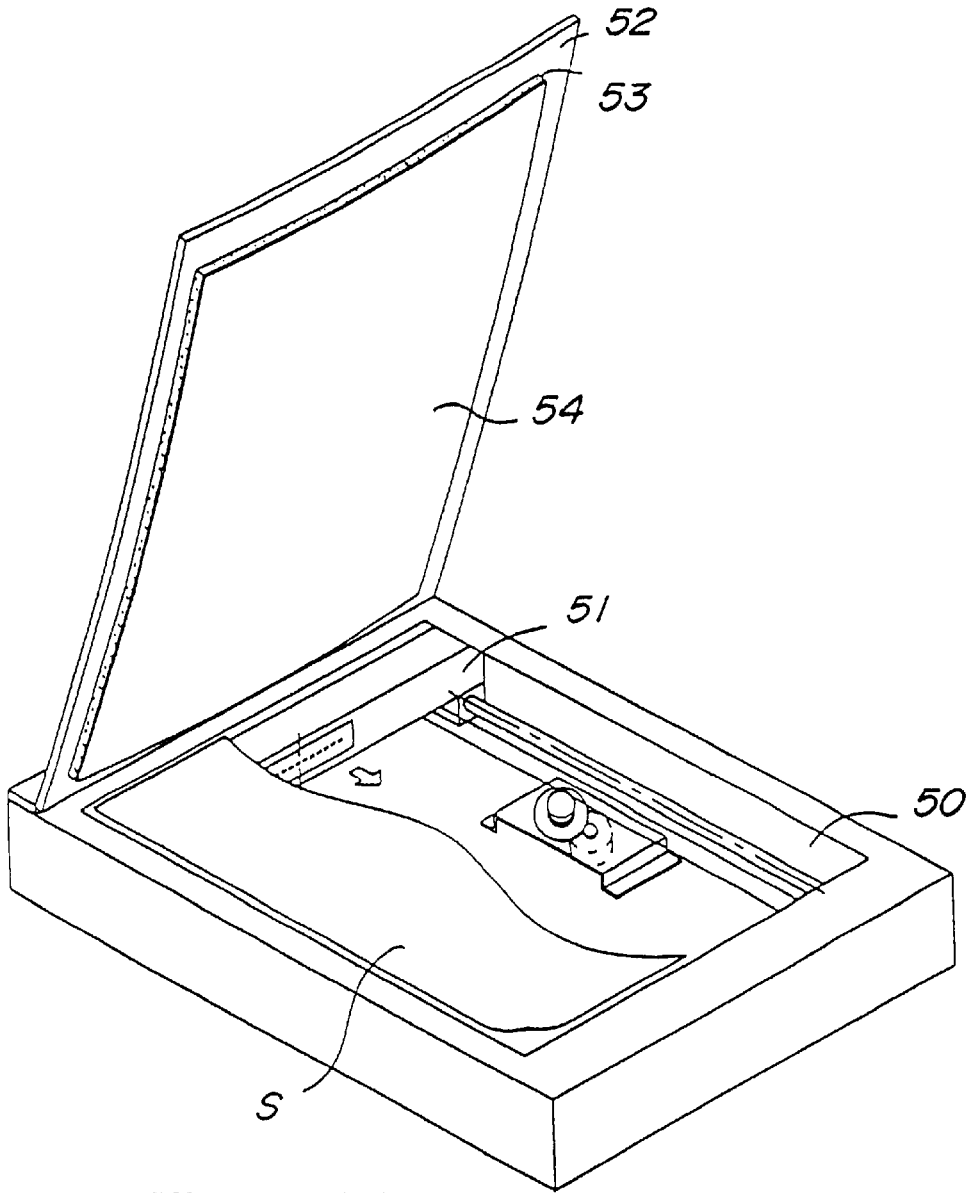
FIG. 35(a) is an explanation view showing a conventional attachment structure of an original document pressing plate and a pressing-contacting sheet member of an original document reading apparatus where the original document pressing plate is warped upwardly.
Figure 35B:
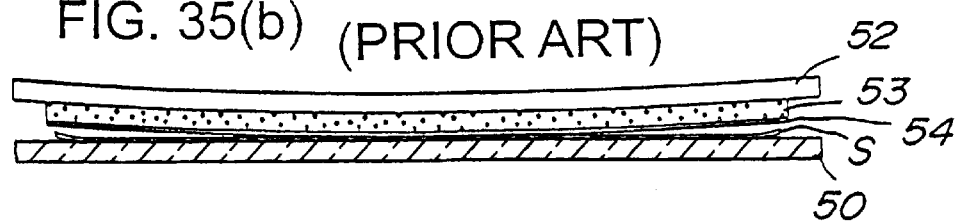
FIG. 35(b) is a cross-sectional view showing an original document holding section of the original document reading apparatus.
Figure 36A:
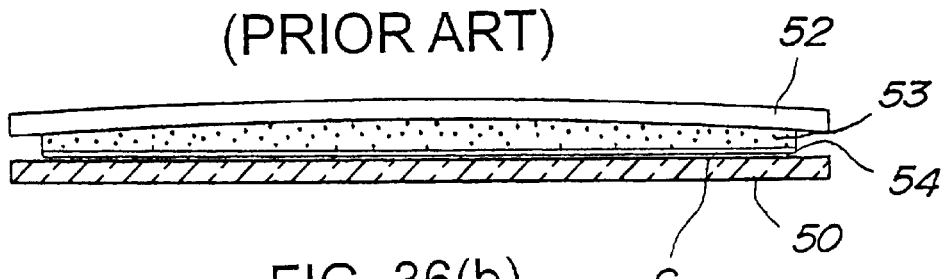
FIG. 36(a) is an explanation view showing a conventional correcting method to keep a flatness of the pressing-contacting sheet member.
Figure 36B:
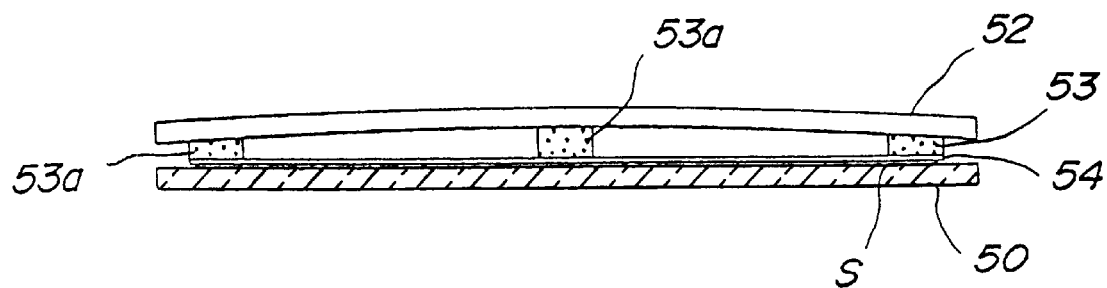
FIG. 36(b) is an explanation view showing a conventional correcting method to keep a flatness of the pressing-contacting sheet member.

In FIG. 33(a), numeral 417 refers to a coil spring constituting a protruding portion as a separated body from the bottom face 441 of the pressing plate main body 404A. As shown in FIG. 33(b), even when the coil spring 417, instead of the protruding portion 415 as mentioned above, is provided and this coil spring 417 is made to extend into the space G, the coil spring 417 pressingly pushes the elastic sheet material 403 with a predetermined pressingly pushing force, and consequently, the pressing-contacting sheet member 402 is closely contacted, across its entire range, with the contact glass 401, without following the warp of the original document pressing plate 404.

With the present invention as mentioned above, by attaching the elastic sheet material and the pressing-contacting sheet member to the peripheral portion of the pressing plate main body while having the space therebetween with the center portion of the pressing plate main body, as well as, by pressingly pushing the elastic sheet material to the direction of the original document by the protruding portion provided in the center portion of the pressing plate main body, it becomes possible that the elastic sheet material and the pressing-contacting sheet member do not follow the warp of the pressing plate main body. Therefore, the original document, even having a curl, can be fully pushed onto the contact glass, without being affected from the warping shape of the pressing plate main body, thereby capable of making the original document closely in contact with the contact glass certainly, and consequently, this normally prevents the original document from floating upwardly.

It is to be noted that a scanner is used as an example of an image reading apparatus in the respective aforementioned embodiments, but the present invention is not limited to this; for example, a copying machine or the like, other than scanner can be applied in the same way.

What is claimed is:

1. An original document holding apparatus for closely contacting an original document with a contact glass surface, said original document holding apparatus comprising:

an original document pressing plate for pressingly pushing the original document mounted on the contact glass surface;

a pressing-contacting sheet member for pressingly contacting the original document with the contact glass surface; and an elastic member placed between said original document pressing plate and said pressing-contacting sheet member for attaching said original document pressing plate and said pressing-contacting sheet member together, wherein said elastic member is only placed in a vicinity of a lowest surface of a warping shape of said original document pressing plate within a placement range of said pressing-contacting sheet member, and wherein said pressing-contacting sheet member is constituted of a resin sheet having a thickness from 0.5 mm to 2 mm, a flatness of 1 mm or less across an entire area of said pressing-contacting sheet member, a flexural rigidity of 200 kgf·mm$^2$ or higher and is attached to said original document pressing plate only through said elastic member.

2. An original document holding apparatus for closely contacting an original document with a contact glass surface, said original document holding apparatus comprising:

an original document pressing plate for pressingly pushing the original document mounted on the contact glass surface;

a pressing-contacting sheet member for pressingly contacting the original document with the contact glass surface; and an elastic member placed between said original document pressing plate and said pressing-contacting sheet member for attaching said original document pressing plate and said pressing-contacting sheet member together, wherein an attachment point of said elastic member with respect to said original document pressing plate is placed in a vicinity of a lowest surface of a warping shape of said original document pressing plate within a placement range of said elastic member, and wherein said elastic member comprises an elastic sheet.

3. An original document holding apparatus for closely contacting an original document with a contact glass surface, said original document holding apparatus comprising:

an original document pressing plate for pressingly pushing the original document mounted on the contact glass surface;

a pressing-contacting sheet member for pressingly contacting said original document with the contact glass surface; and an elastic member placed between said original document pressing plate and said pressing-contacting sheet member for attaching said original document pressing plate and said pressing-contacting sheet member together, wherein an attachment point of said pressing-contacting sheet member with respect to said elastic member is placed in a vicinity of a lowest surface of a warping shape of said elastic member attached to the original document pressing plate within a placement range of said pressing-contacting sheet member.

4. An image reading apparatus for reading original document information by closely contacting the original document with a contact glass surface, said image reading apparatus comprising:

an original document holding apparatus according to any one of claims 1 to 3; and reading means for optically reading the original document closely contacted with the contact glass surface by said original document holding apparatus.

5. An original document holding apparatus for closely contacting an original document with a contact glass surface, said original document holding apparatus comprising:

an original document pressing plate for pressingly pushing the original document mounted on the contact glass surface;

a pressing-contacting sheet member for pressingly contacting the original document with the contact glass surface; and an elastic member placed between said original document pressing plate and said pressing-contacting sheet member for attaching said original document pressing plate and said pressing-contacting sheet member together, wherein said pressing-contacting sheet member is constituted of a resin sheet having a thickness from 0.5 mm to 2 mm, a flatness of 1 mm or less across an entire area of said pressing contact sheet member, a flexural rigidity of 200 kgf·mm$^2$ or higher, and a flexibility allowing said pressing contact sheet member to conform to the contact glass surface.

6. The original document holding apparatus according to claim 5, wherein an attachment portion between said elastic member and said original document pressing plate is placed in a vicinity of a lowest surface of a warping shape of said original document pressing plate.

7. The original document holding apparatus according to claim 5, wherein an attachment portion between said pressing-contacting sheet member and said elastic member is placed in a vicinity of a lowest surface of a warping shape of said original document pressing plate.

8. The original document holding apparatus according to any one of claims 5 to 7, wherein said elastic member is a integrally-foamed body.

9. The original document holding apparatus according to any one of claims 5 to 7 wherein said elastic member is a spring member.

10. An image reading apparatus for reading original document information by closely contacting the original document with a contact glass surface, said image reading apparatus comprising:
    an original document holding apparatus according to any one of claims 5 to 7; and
    reading means for optically reading the original document closely contacted with the contact glass surface by said original document holding apparatus.

11. An original document holding apparatus for closely contacting an original document with a contact glass surface, a main body of said original document holding apparatus including a contact glass surface said original document holding apparatus comprising:
    an original document pressing plate displaceable between a closing position for pressingly pushing the original document mounted on the contact glass surface and an opening position for releasing the pressingly pushing operation; and
    a pressing-contacting sheet member for pressingly contacting the original document with the contact glass surface,
        wherein the pressing-contacting sheet member is constituted of a resin sheet having a thickness from 0.5 mm to 2 mm, a flatness of 1 mm or less across an entire area of said pressing-contacting sheet member, a flexural rigidity of 200 kgf·mm$^2$ or higher, and a flexibility following the contact glass surface, and
        wherein elastic members are placed in a plurality of points between said pressing-contacting sheet member and said original document pressing plate.

12. The original document holding apparatus according to claim 11, wherein said original document pressing plate is rotatable with respect to a main body of said original document holding apparatus, and, when said original document pressing plate is rotated to the closing position, an original document pressingly pushing force by said elastic members is lower in a position near to a rotary center of said original document pressing plate than that in a position displaced from the rotary center.

13. The original document holding apparatus according to claim 11, wherein said pressing-contacting sheet member comprises a resin sheet having a reflectance of 87% or higher and a whiteness degree of 70% or higher.

14. An image reading apparatus for reading original document information by closely contacting the original document with a contact glass surface, said image reading apparatus comprising:
    an original document holding apparatus according to any one of claims 11 to 13; and
    reading means for optically reading the original document closely contacted with the contact glass surface by said original document holding apparatus.

15. The original document holding apparatus according to claim 11, wherein one or more rib members are provided between said original document pressing plate and said pressing-contacting sheet member, said one or more rib members separated from said pressing-contacting sheet member or said original document pressing plate when said original document pressing plate is in the closing position under a state where no load is applied.

16. The original document holding apparatus according to claim 15, wherein a space between said one or more rib members and said pressing-contacting sheet member or between said one or more rib members and said original document pressing plate is in the range from 0.1 mm to 1 mm.

17. The original document holding apparatus according to claim 15, wherein said one or more rib members are integrally formed with said original document pressing plate or with said pressing-contacting sheet member.

18. An image reading apparatus for reading original document information by pressingly contacting an original document with a contact glass surface, said image reading apparatus comprising:
    a main body of the apparatus having the contact glass surface and reading means for optically reading the original document pressingly contacted with the contact glass surface; and
    an original document holding apparatus attached movably up and down to the main body of the apparatus, said original document holding apparatus comprising:
        a pressing plate main body with its center portion upwardly curving for pressingly pushing the original document mounted on the contact glass surface;
        a pressing-contacting sheet member provided below a lower surface of said pressing plate main body for pressingly contacting the original document mounted on the contact glass surface;
        an elastic sheet material placed between said pressing plate main body and said pressing-contacting sheet member for attaching said pressing plate main body and said pressing-contacting sheet member together; and
        one or more protruding portions extending from said pressing plate main body into a space formed between said pressing plate main body and a center portion of said pressing-contacting sheet member, for pressingly pushing said elastic sheet material toward a direction of the original document.

19. The image reading apparatus according to claim 18, wherein said one or more protruding portions are integrally formed with the pressing plate main body.

20. The image reading apparatus according to claim 18, wherein said one or more protruding portions are a separated body from the pressing plate main body.

21. The image reading apparatus according to any one of claims 18 to 20, wherein a plurality of said one or more protruding portions are formed in a center portion of said pressing plate main body.

22. The image reading apparatus according to claims from claims 18 to 20, wherein said one or more protruding portions are elastic members.

23. An original document holding apparatus for closely contacting an original document with a contact glass surface, said original document holding apparatus comprising:

an original document pressing plate for pressingly pushing said original document mounted on the contact glass surface;

a pressing-contacting sheet member for pressingly contacting said original document with the contact glass surface; and an elastic member placed between said original document pressing plate and said pressing-contacting sheet member for attaching said original document pressing plate and said pressing-contacting sheet member together, wherein said elastic member comprises an elastic sheet, wherein said original document pressing plate is warped downwardly so as to make its center portion higher and its end portions lower, and wherein said pressing-contacting sheet member is fixed through said elastic member to both said end portions of said original document pressing plate.

24. An original document holding apparatus for closely contacting an original document with a contact glass surface, said original document holding apparatus comprising:

an original document pressing plate for pressingly pushing the original document mounted on the contact glass surface;

a pressing-contacting sheet member for pressingly contacting the original document with the contact glass surface; and an elastic member placed between said original document pressing plate and said pressing-contacting sheet member for attaching said original document pressing plate and said pressing-contacting sheet member together, wherein said original document pressing plate is warped upwardly such that end portions of said original document pressing plate is higher than a center portion of said original document pressing plate, and wherein said pressing-contacting sheet member is fixed through said elastic member to the center portion of said original document pressing plate.

25. The original document holding apparatus according to claim 24, wherein said elastic member comprises an elastic block.

26. The original document holding apparatus according to claim 24, wherein said elastic member comprises an elastic sheet.

27. An image reading apparatus for reading original document information by closely contacting the original document with a contact glass surface comprising:

an original document holding apparatus according to any one of claims 24 to 26; and reading means for optically reading the original document closely contacted with the contact glass surface by said original document holding apparatus.

\* \* \* \* \*

UNITED STATES PATENT AND TRADEMARK OFFICE
CERTIFICATE OF CORRECTION

PATENT NO. : 6,405,017 B1
DATED : June 11, 2002
INVENTOR(S) : Toshio Takahashi et al.

It is certified that error appears in the above-identified patent and that said Letters Patent is hereby corrected as shown below:

Column 1,
Line 34, "pressingcon-" should read -- pressing-con- --.

Column 2,
Line 37, "pressingcontacting" should read -- pressing-contacting --.

Column 5,
Line 3, "present;" should read -- present invention; --;
Line 7, "pressingcontacting" should read -- pressing-contacting --; and
Line 58, "pressingcontacting" should read -- pressing-contacting --.

Column 8,
Line 30, "our" should read -- own --.

Column 9,
Line 29, "comers" should read -- corners --;
Line 31, "comers," should read -- corners, --;
Line 46, "is" should read -- are --;
Line 55, "pressingcontacting" should read -- pressing-contacting --; and
Line 65, "Forth" should read -- Fourth --.

Column 10,
Line 47, "comers" should read -- corners --; and
Line 65, "the" should read -- its --.

Column 11,
Line 2, "flatten" should read -- flattened --.

Column 12,
Line 25, "comers" should read -- corners --.

Column 13,
Line 5, "Nest," should read -- Next, --;
Line 8, "shows" should read -- show --; and
Line 15, "shows" should read -- show --.

UNITED STATES PATENT AND TRADEMARK OFFICE
CERTIFICATE OF CORRECTION

PATENT NO.    : 6,405,017 B1
DATED         : June 11, 2002
INVENTOR(S)   : Toshio Takahashi et al.

It is certified that error appears in the above-identified patent and that said Letters Patent is hereby corrected as shown below:

Column 14,
Lines 24 and 27, "member" should read -- members --;
Line 26, "members" should read -- member --;
Line 36, "pressingcontacting" should read -- pressing-contacting --; and
Line 40, "ingcontacting" should read -- ing-contacting --.

Column 15,
Line 1, "Force" should read -- force --;
Line 38, "comers" should read -- corners --;
Lines 43 and 46, "spring" should read -- springs --; and
Line 62, "pressingcontacting" should read -- pressing-contacting --.

Column 18,
Line 15, "pressingcontacting" should read -- pressing-contacting --.

Column 19,
Line 4, "FIG. 33." should read -- FIGS. 33(a) and 33(b). --.

Column 20,
Line 11, "member-" should read -- member --.

Column 21,
Line 15, "7" should read -- 7, --.

Column 22,
Line 61, "claims from" should read -- any one of --.

Signed and Sealed this

Thirty-first Day of December, 2002

JAMES E. ROGAN
*Director of the United States Patent and Trademark Office*